US007823158B2

(12) United States Patent
Beatty, III et al.

(10) Patent No.: US 7,823,158 B2
(45) Date of Patent: Oct. 26, 2010

(54) ADAPTIVE SCHEDULING AND MANAGEMENT OF WORK PROCESSING IN A TARGET CONTEXT IN RESOURCE CONTENTION

(75) Inventors: Harry John Beatty, III, Clinton Corners, NY (US); Peter Claude Elmendorf, Poughkeepsie, NY (US); Chen Luo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1469 days.

(21) Appl. No.: 11/207,071

(22) Filed: Aug. 18, 2005

(65) Prior Publication Data
US 2007/0044104 A1 Feb. 22, 2007

(51) Int. Cl.
*G06F 9/46* (2006.01)
(52) U.S. Cl. ........................ 718/108; 718/102
(58) Field of Classification Search .................. 718/108
See application file for complete search history.

(56) References Cited

U.S. PATENT DOCUMENTS

| 5,129,080 | A |   | 7/1992  | Smith              |         |
|-----------|---|---|---------|--------------------|---------|
| 5,353,418 | A |   | 10/1994 | Nikhil et al.      |         |
| 5,361,337 | A |   | 11/1994 | Okin               | 395/375 |
| 5,386,525 | A |   | 1/1995  | Noack              |         |
| 5,485,626 | A |   | 1/1996  | Lawlor et al.      |         |
| 5,524,247 | A | * | 6/1996  | Mizuno             | 710/200 |
| 5,692,193 | A |   | 11/1997 | Jagannathan et al. |         |
| 5,928,323 | A |   | 7/1999  | Gosling et al.     |         |
| 5,937,194 | A |   | 8/1999  | Sundaresan         |         |
| 5,991,792 | A |   | 11/1999 | Nageswaran         |         |
| 6,049,867 | A |   | 4/2000  | Eickemeyer et al.  | 712/228 |
| 6,058,460 | A |   | 5/2000  | Nakhimovsky        |         |

(Continued)

FOREIGN PATENT DOCUMENTS

EP    0 897 150 A2    2/1999

(Continued)

OTHER PUBLICATIONS

Office Action of U.S. Appl. No. 09/597,524 (U.S. Letters Patent No. 7,140,018), dated Jul. 31, 2003.

(Continued)

*Primary Examiner*—Meng-Ai An
*Assistant Examiner*—Gregory A Kessler
(74) *Attorney, Agent, or Firm*—Heslin, Rothenberg, Farley & Mesiti, PC

(57) ABSTRACT

A computing environment and techniques are provided for processing work out of order in one or more processing contexts. The processing techniques include: determining, for a processing context having an associated stack of waiting resources, whether a last-in listed resource in the stack of waiting resource is available, and if so, resuming processing of a suspended unit of work requiring the last-in listed resource; and determining, otherwise, whether an out of order execution unit of work is available for processing in the context, and if so, processing the out of order execution unit of work while the suspended unit of work awaits the last-in listed resource. Out of order execution units of work can be processed in order from a regular unit of work queue, or out of order from an out of order unit of work queue of a processing context.

21 Claims, 13 Drawing Sheets

U.S. PATENT DOCUMENTS

| | | | | |
|---|---|---|---|---|
| 6,061,711 | A | 5/2000 | Song et al. | 709/108 |
| 6,085,217 | A | 7/2000 | Ault et al. | |
| 6,167,423 | A | 12/2000 | Chopra et al. | |
| 6,170,018 | B1 | 1/2001 | Voll et al. | |
| 6,330,584 | B1 * | 12/2001 | Joffe et al. | 718/107 |
| 6,349,312 | B1 | 2/2002 | Fresko et al. | |
| 6,401,155 | B1 | 6/2002 | Saville et al. | 710/266 |
| 6,427,161 | B1 | 7/2002 | LiVecchi | |
| 6,442,550 | B1 | 8/2002 | Rajamony | |
| 6,477,586 | B1 | 11/2002 | Achenson et al. | |
| 6,496,909 | B1 | 12/2002 | Schimmel | |
| 6,499,048 | B1 | 12/2002 | Williams | 709/102 |
| 6,505,229 | B1 * | 1/2003 | Turner et al. | 718/107 |
| 6,507,862 | B1 | 1/2003 | Joy et al. | |
| 6,507,903 | B1 | 1/2003 | Beatty, III et al. | 711/173 |
| 6,542,921 | B1 | 4/2003 | Sager | 709/108 |
| 6,549,930 | B1 | 4/2003 | Chrysos et al. | 709/104 |
| 6,567,839 | B1 | 5/2003 | Borkenhagen et al. | 709/103 |
| 6,662,364 | B1 | 12/2003 | Burrows et al. | 718/102 |
| 6,687,729 | B1 | 2/2004 | Sievert et al. | |
| 6,697,935 | B1 | 2/2004 | Borkenhagen et al. | 712/228 |
| 6,731,288 | B2 | 5/2004 | Parsons et al. | 345/502 |
| 6,735,760 | B1 | 5/2004 | Dice | 717/139 |
| 6,804,815 | B1 | 10/2004 | Kerr et al. | 718/100 |
| 6,832,376 | B1 | 12/2004 | Sievert et al. | |
| 6,832,378 | B1 | 12/2004 | Beatty, III et al. | 718/104 |
| 6,886,081 | B2 * | 4/2005 | Harres | 711/152 |
| 7,140,018 | B1 | 11/2006 | Beatty, III et al. | |
| 2001/0004755 | A1 | 6/2001 | Levy et al. | 712/217 |
| 2002/0120601 | A1 | 8/2002 | Elmendorf et al. | 707/1 |
| 2002/0194377 | A1 | 12/2002 | Doolittle et al. | |
| 2004/0010667 | A1 * | 1/2004 | Brenner | 711/158 |
| 2004/0088519 | A1 | 5/2004 | Karim | 712/1 |
| 2004/0215932 | A1 * | 10/2004 | Burky et al. | 712/43 |
| 2004/0252709 | A1 * | 12/2004 | Fineberg | 370/412 |
| 2005/0076335 | A1 * | 4/2005 | Cavage et al. | 718/100 |

FOREIGN PATENT DOCUMENTS

| | | |
|---|---|---|
| EP | 0 899 660 A1 | 3/1999 |
| EP | 0 909 094 A1 | 4/1999 |
| EP | 0 936 544 A2 | 8/1999 |
| JP | 07-084804 | 3/1995 |
| JP | 09-069053 | 3/1997 |
| WO | WO 99/10811 A2 | 4/1999 |

OTHER PUBLICATIONS

Office Action of U.S. Appl. No. 09/597,524 (U.S. Letters Patent No. 7,140,018), dated Jan. 14, 2004.

Office Action of U.S. Appl. No. 09/597,524 (U.S. Letters Patent No. 7,140,018), dated Jul. 30, 2004.

Office Action of U.S. Appl. No. 09/597,524 (U.S. Letters Patent No. 7,140,018), dated Feb. 14, 2005.

Office Action of U.S. Appl. No. 09/597,524 (U.S. Letters Patent No. 7,140,018), dated Aug. 1, 2005.

Office Action of U.S. Appl. No. 09/597,524 (U.S. Letters Patent No. 7,140,018), dated Feb. 13, 2006.

"Multisequencing in a Single Instruction Stream Processing of Parallel Streams", IBM Technical Disclosure Bulletin, vol. 37, No. 01, pp. 133-139 (Jan. 1994).

"Implementing a CSR-PCS as Multiple Threads", IBM Technical Disclosure Bulletin, vol. 36, No. 12, pp. 57-61 (Dec. 1993).

Kavi et al., "A Decoupled Scheduled Dataflow Multithreaded Architecture", IEEE Proceedings, pp. 138-143 (Aug. 1999).

Ziles et al., "The Use of Multithreading for Exception Handling", IEEE, pp. 219-229 (1999).

Domani et al., "Thread-Local Heaps for Java", ISMM, pp. 76-87 (Jun. 20-21, 2002).

Dice et al., "Mostly Lock-Free Malloc", ISMM, pp. 163-174 (Jun. 20-21, 2002).

Chase et al., "Sharing and Protection in a Single-Address-Space Operating System", ACM Transactions on Computer Systems, vol. 12, No. 4, pp. 271-307 (Nov. 1994).

Halstead et al., "MASA: A Multithreaded Processor Architecture for Parallel Symbolic Computing", IEEE, pp. 443-451 (1998).

Beatty, III et al., "Method of Using a Distinct Flow of Computational Control as a Reusable Data Object," U.S. Appl. No. 09/597,524, filed Jun. 20, 2000.

* cited by examiner

ADAPTIVE SCHEDULING AND MANAGEMENT OF WORK PROCESSING IN A TARGET CONTEXT IN RESOURCE CONTENTION

CROSS-REFERENCE TO RELATED APPLICATION

This application contains subject matter which is related to the subject matter of the following application, which is assigned to the same assignee as this application and which is hereby incorporated herein by reference in its entirety:

"Method of Using a Distinct Flow of Computational Control as a Reusable Data Object", Beatty, III et al., U.S. Pat. No. 7,140,018, issued Nov. 21, 2006.

TECHNICAL FIELD

The present invention relates to computer processing and, in particular, to parallel computer programming or processing.

BACKGROUND OF THE INVENTION

In prior art computing using separate, non-parallel processing, programs often share data and other services. An example of this is shown in FIG. 1, where separate processing memories 19a, 19b, which may by physically separated in different memory storage, or logically separated in the same memory storage, contain global variable memory 20a for data items visible to the entire process, heap memory 21a for data structure, stack memory 23a for function arguments, and local data items, and free memory space 22a, which may be utilized as needed for either heap or stack memory space. A portion of the free memory space may be designated as common memory 22c available to both program A, 24a, or program B, 24b, which operate in the separate process memories 19a, 19b, respectively. Each program A and B can access in the process memory only what is designated in the common area 22c, and cannot access other memory between the programs. A programmer utilizing the system of FIG. 1 has relatively little assistance from the system in restricting access to data structures in common memory.

Parallel processing offers improvements in that a single program can run simultaneously different threads or independent flows of control managed by the program. Multiple threads may execute in a parallel manner, and the threads may share information in either a loosely or tightly coupled manner. An example of a parallel processing arrangement is shown in FIG. 2 where a single process memory 119, having a common global memory 120 and a common heap space 121, contains a plurality of stack spaces 123a, 123b, with a single program 124 operating a plurality of threads, with one stack per program thread. The process memory structure shown can operate any number of threads 1-N, and contain any number of corresponding stacks 1-N, as shown.

Coordinated data access between threads usually requires operating system assistance (with associated penalties), such as semaphores or locks. However, in typical parallel processing applications, serialization caused by use of system services such as storage management, and coordination of access to memory often significantly reduces the attainable performance advantages of a parallel algorithm. Serialization occurs when more than one thread accesses or requests a data object or other system resource. If such a conflict occurs, only one thread has access and all other threads are denied access until the first thread is finished with the system resource. For example, the structure shown in FIG. 2 is error-prone because heap space, which contains information that is being manipulated by the program, is subject to collision as different threads attempt to access the same data structure at the same time. When this occurs, one or more threads have to wait while the data structure is accessed by another program thread.

In current practice, memory management in parallel software is also an area where complexity and inefficiency are major drawbacks. The benefits of parallel execution can be degraded, or even nullified to where sequential execution is faster, when calls are made to allocate or free memory. This is due to current serialization techniques, which must be employed to prevent collisions when two or more flows of control, i.e., threads, attempt to obtain or free memory areas. This can significantly degrade the performance of parallel programs, forcing unnatural exercises in program design and implementation. These contortions compromise maintainability, extensibility, and are a source of errors. Worse yet, the costs associated with these problems can deter developers from even considering otherwise viable parallel solutions.

In parallel programming, as described above, each thread is assigned a specific unit of work to perform, generally in parallel, and when the work is finished, the threads cease to exist. There is a cost to create a thread, terminate a thread, and to manage a thread. The cost has both machine-cycle components and programming complexity components. The programming complexity components are a source of errors in implementation and design of the software. The prevailing paradigm in the use of threads treats the threads and data differently. There is control flow (threads), and there is data. The resulting dichotomy creates an environment which tends to place fetters on the kinds of solutions envisioned, and creates complexity and resulting error-proneness during implementation.

Further, in a parallel programming environment, where units of work are appended to a regular unit of work queue of another context, and the target context is suspended on a mutex or is about to become suspended on a mutex, processing of units of work from the queue of the target context is conventionally suspended until the mutexes are released. This may not necessarily be an unwanted situation, but the behavior does waste computational time.

Thus, there remains a need in the art of computer processing for further enhancements to conventional unit of work processing techniques, for example, to enhance computational efficiency, notwithstanding that a context may be in resource contention.

SUMMARY OF THE INVENTION

The shortcomings of the prior art are overcome and additional advantages are provided through the provision of a computer-implemented method for processing work in a processing context of a computing environment. The method includes: determining, for a processing context comprising a stack identifying waiting resources, whether a last-in listed resource in the stack of waiting resources is available, and if so, resuming processing of a suspended unit of work requiring the last-in listed resource; and determining, otherwise, whether an out of order execution unit of work is available in the context, and if so, processing the out of order execution unit of work while the suspended unit of work awaits the last-in listed resource.

In another aspect, a computer-implemented method for processing work within a computing environment having multiple contexts is provided. This method includes: launching from a first context of the computing environment an out of order execution unit of work on a second context of the computing environment, the launching including adding the out of order execution unit of work to at least one of a regular unit of work queue and an out of order unit of work queue of the second context, wherein the out of order execution unit of work is a designated unit of work can be processed out of sequential order from other units of work queued on the second context; and determining whether the second context is sleeping, and if so, awaking the second context to facilitate processing of the out of order execution unit of work.

In yet another aspect, a computing environment is provided which includes multiple processing contexts coupled in communication for parallel processing of work. At least one processing context of the multiple processing contexts includes a regular unit of work queue and an out of order unit of work queue. The regular unit of work queue stores units of work for sequential first-in first-out processing thereof by the at least one processing context, while the out of order unit of work queue stores designated out of order execution units of work from other contexts. The designated out of order execution units of work can be processed out of order from other units of work in the regular unit of work queue.

In a further aspect, at least one program storage device readable by a machine, tangibly embodying at least one program of instructions executable by the machine to perform a method for processing work in a processing context of a computing environment is provided. The method includes: determining, for a processing context including a stack of waiting resources, whether a last-in listed resource in the stack of waiting resources is available, and if so, resuming processing of a suspended unit of work requiring the last-in listed resource; and determining, otherwise, whether an out of order execution unit of work is available for processing in the context, and if so, processing the out of order execution unit of work while the suspended unit of work awaits the last-in listed resource.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
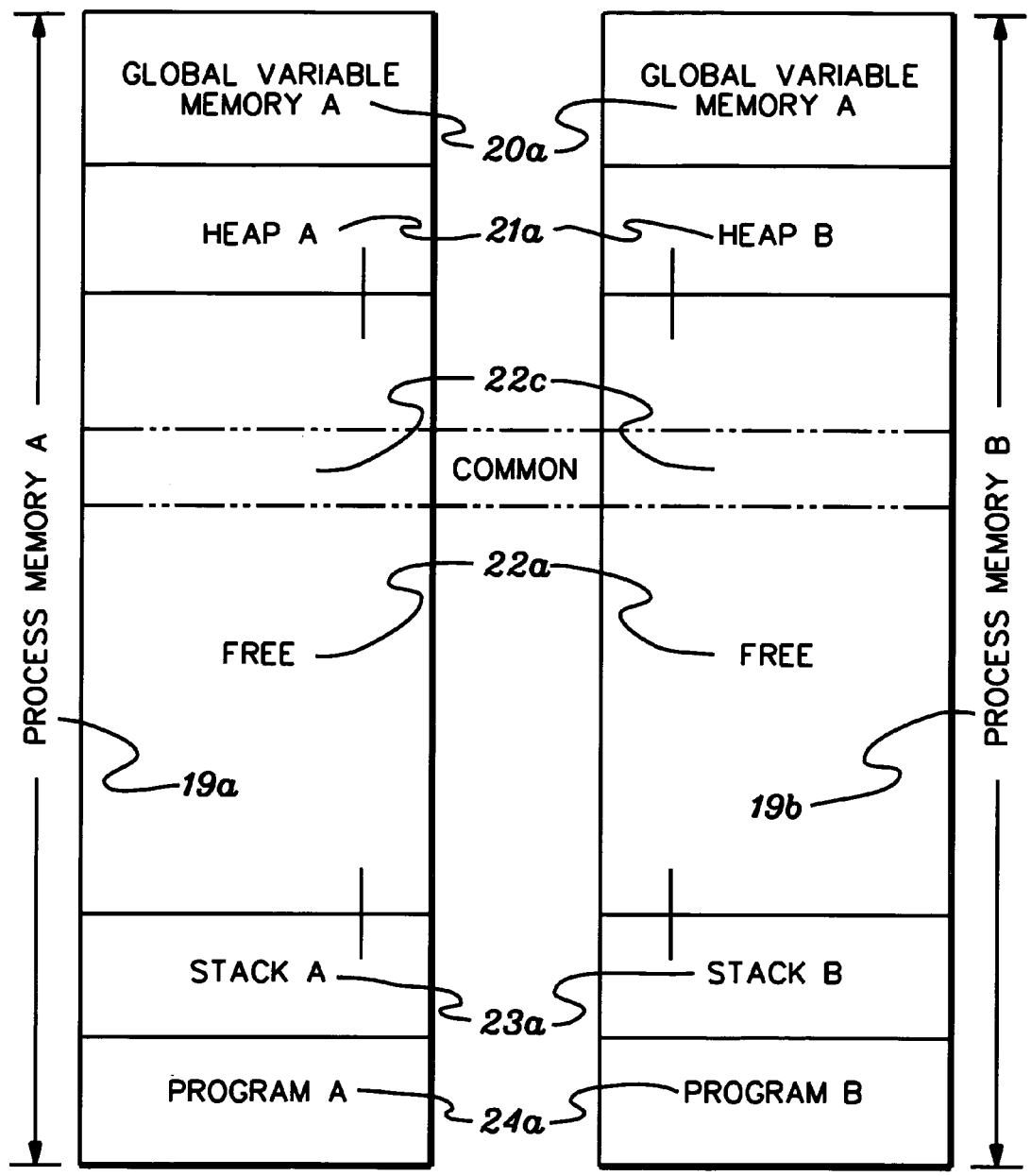
FIG. 1 is a schematic diagram of a prior art memory structure for separate programs.
Figure 2:
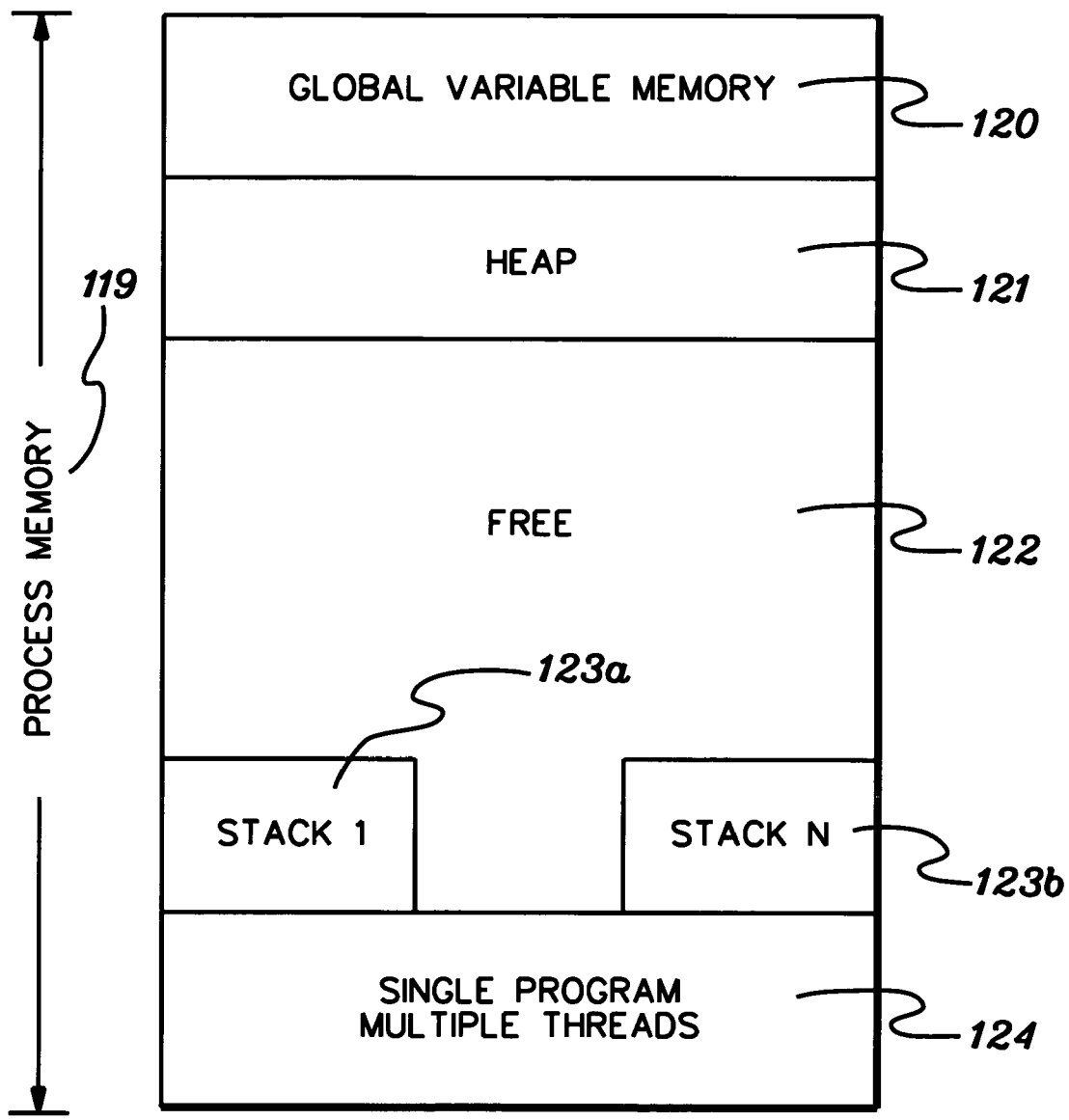
FIG. 2 is a schematic diagram of a prior art memory structure for parallel programs.

In describing the preferred embodiment of the present invention, reference is made herein to FIGS. 1-15 of the drawings in which like numerals refer to like features of the invention. Features of the invention are not necessarily shown to scale in the drawings.

The system and work management techniques of the present invention incorporating the concepts described further below may be stored on an otherwise conventional computer program or memory storage device, such as a semiconductor chip, a read-only memory, or magnetic media such as a diskette or computer hard drive.

In the structure created by one aspect of the present invention, each thread has its own data space, i.e., memory areas associated with a single thread, that is separated from all other data spaces except where explicitly declared to be common. Use of the invention naturally enables the design and implementation of parallel algorithms with minimal and well defined data space interaction, thus providing low cost, high performance parallelism without necessitating the programmer being an expert in the management of parallelism.

Figure 3:
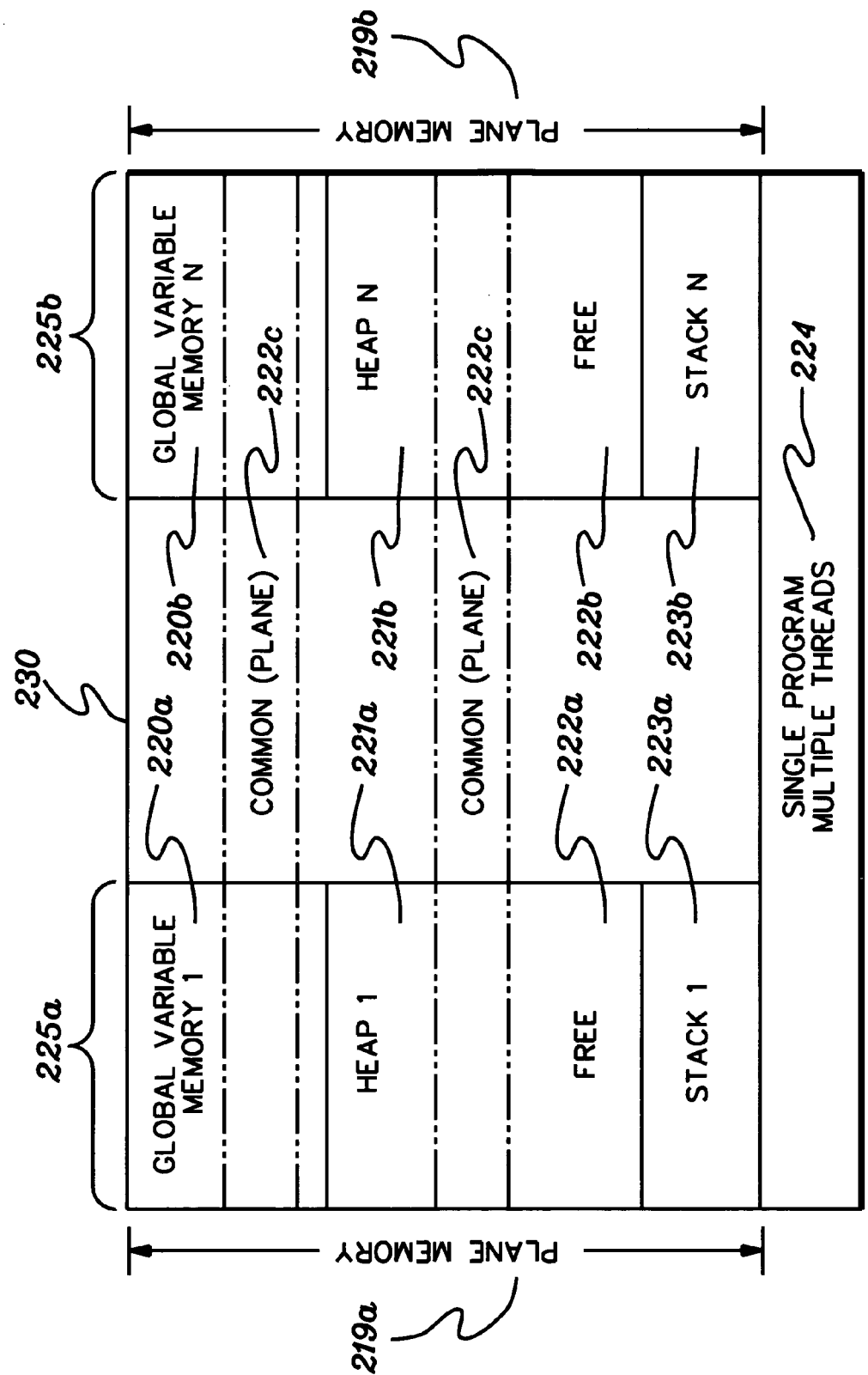
FIG. 3 is a schematic diagram of a first level of hierarchy for a parallel memory structure in accordance with an aspect of the present invention, referred to herein as a plane, and the grouping of two or more planes into a space.

The parallel structure of the present invention provides different stacks, one for each thread, and provides the appearance and function of having different separate global memory, heap space and free zones for each stack. FIG. 3 depicts a first level of hierarchy for the parallel memory structure of the present invention, referred to herein as a "plane", and the grouping of two or more planes into a "space". Memory is subdivided into separate planes 225a, 225b. Planes 225a, 225b have different plane memory areas 219a, 219b. One thread from program structure 224 runs on a stack in each plane, and a plurality of threads 1-N may run on a plurality of stacks 1-N, respectively. While threads run simultaneously in the parallel computing system, there is at most one thread accessing a plane memory at any given moment. Plane memories 219a, 219b contain global memories 220a, 220b, heap spaces 221a, 221b and free spaces 222a, 222b, respectively, which are organized and provided for each plane 225a, 225b, respectively. Each plane then consists of a context defined by the thread, global memory, heap memory, and stack memory. Only one thread uses a context at any particular time. There is also explicitly declared a common (plane) area 222c which is shared by the otherwise separate plane memories 219a, 219b. Accordingly, from the viewpoint of a programmer, the plane memory structure has the appearance and functionality of running separate programs, as shown in FIG. 1, which in reality it operates as parallel threads because all of the data structures in common (plane) memory 222c are available, and selected data structures in heaps 221a, 221b are available across different planes, to each thread in stacks 223a, 223b.

The grouping in a memory structure of a plurality of planes, all running different threads of a single program structure in parallel, is referred to herein as a "space". A collection of programs makes a single consistent program structure in such space. Space 230 represents the second level of hierarchy in the parallel processing system of the present invention. A plurality of spaces can also be provided, where each space contains one or more plane memory structures. Each space contains a different program running independently of each other program. Free memory may be designated as common (space) among different spaces, in a manner analogous to that of common (plane) memory. The plurality of spaces represents a third level of hierarchy in the present invention.

Global or heap memory objects not explicitly made common are represented by particular language elements. Such objects, though represented in all planes by the same language elements, are backed by separated memory in each plane. Thus, language elements are automatically instantiated for each thread. This relieves the programmer of the burdensome task of managing and separating such memory objects. The memory constructs of the present invention also provide a disciplined means of sharing information between planes and spaces, relieving the programmer from the burden of providing the discipline.

Figure 4:
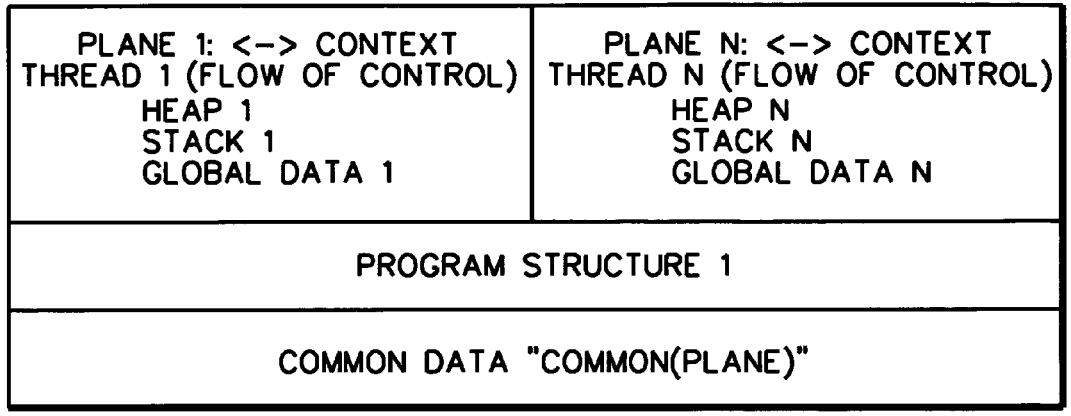
FIG. 4 is a schematic diagram depicting the context or indexing structure of the space shown in FIG. 3 showing access to default global data within a plane and data in common (plane) memory, in accordance with an aspect of the present invention.

As shown in FIG. 4, each of the planes in a designated space consists of context (a thread, heap, stack, global data) and the same program structure, the latter using the same executable program code. The same program structure is used for each plane in the space. Between different spaces, the program structures may be the same or may be different. The "context", as used herein, refers to the indexing structure which achieves separation of the global variables such that each global variable may be readily accessed by each thread. The programmer using the memory structure of the present invention creates the particular context desired, and, using such context, invokes a program which operates within that particular context outside of common (plane) or common (space) memory.

Figure 5:
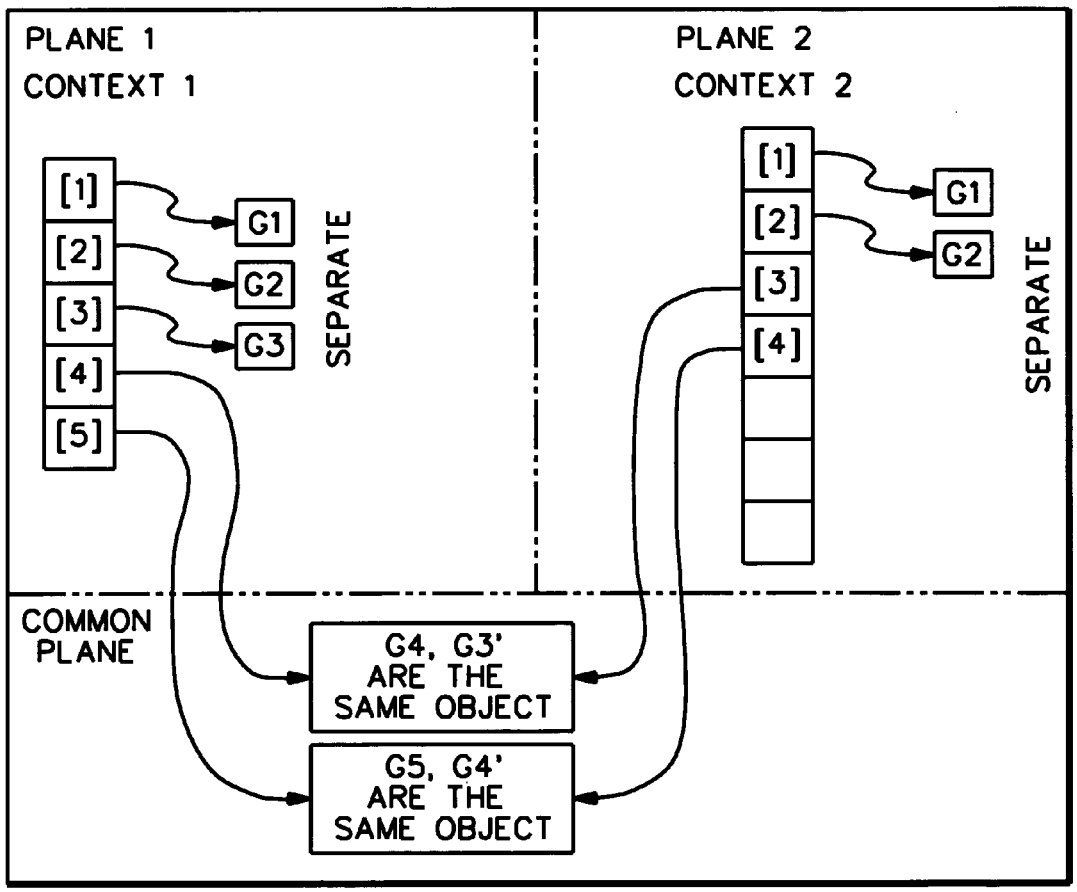
FIG. 5 is a schematic diagram of the context indexing structure linking an integer identification of each global variable to a unique identification, in accordance with an aspect of the present invention.

The context indexing structure in particular links an integer identification of each global variable to a unique identification such as a memory address. For example, as shown in FIG. 5, within Plane, there are global variables G.sub.1, G.sub.2, G.sub.3, and within Plane.sub.2 there are separate global variables G.sub.1, G.sub.2. Global data variables designated G.sub.4 (Plane.sub.1, Context.sub.1), G.sub.3 (Plane.sub.2, Context.sub.2) and G.sub.5 (Plane.sub.1, Context.sub.1), G.sub.4. (Plane.sub.2, Context.sub.2) are designated to reside in the common (plane), inside space. Each one of Context.sub.1 in a first plane, and Context.sub.2 in a second plane, is able to use an indexing scheme to translate its own integer ID for the global variables to the unique ID of the global variables. As shown, G.sub.4 and G.sub.3, and G.sub.5 and G.sub.4 in common (plane) are the same objects.

An exchangeable function table, created under IEEE standard 1481-1999, is preferably created in the memory structure of the present invention, with one such function table created for each space. Function tables are depicted in Tables 1 and 2 below wherein a function pointer (FCN Pointer) is established for selected function names (FCN Name) employed in a particular space.

TABLE 1

| FCN Pointer | FCN Name |
|---|---|
| * | FCN 1 |
| * | FCN 2 |
| * | FCN 3 |

TABLE 2

| FCN Pointer | FCN Name |
|---|---|
| * | FCN 4 |
| * | FCN 5 |
| * | FCN 6 |

An application program may load a program into each space. The application and the loaded programs each perform a function table exchange. The function table exchange represents an exchange of services between the application and the program loaded in a particular space. All function calls have a context argument in order to find requested data in the common (plane) or common (space) memory. The context conveys where the indexing structure is located. Function calls, by application or loaded programs, include identification of context to locate data in either the data within a plane, considered to be the default location, or the common (plane) or common (space) memory locations.

Delay Calculator Language (DCL) is a language used by many application specific integrated circuit (ASIC) vendors to describe their technologies. These DCL libraries are executable modules dynamically loaded by an application. A well-defined standard is followed by both the application vendors and ASIC vendors. Both the DCL and this interface definition may be employed to establish the system of parallel processing in accordance with the present invention. The DCL system (which consists of a run-time environment, a compiler, and its compiled modules) implements a context system where at most one thread executes on each context. A context is constructed either at the request of the application or the library. In response to a new context request, the DCL run-time environment creates a separate copy of each state variable. State variables include variables created by ASSIGN statements, tables, and module structure. Each state is represented by an array of state variables where each context has its own state variable. For each new context, the system executes the initializing statements on that context such that the state variables are present to known values.

The basic operation of DCL requires that the current context variable (standard structure) be passed to all statements. The context variable provides a complete description of the control flow and data space and plane upon which to execute. The run-time support facility will transparently select appropriate memory objects needed to support application requests and parallel execution of the DCL program. Using DCL, global variables may be created using ASSIGN statements. This permits global variables to be identified by the statement type (ASSIGN) at compile time, and the update to the global variables can be concentrated through a single function.

The present invention separates the ASSIGN results by context, such as an array of ASSIGN variable results where each array element is associated with a context. This will allow parallel reading and writing of ASSIGN variable values without serialization. TABLEDEF statements in DCL read in and search tables of information. The present invention separates these tables by the aforedescribed system of contexts, which permits these tables to be read, searched and updated in a true parallel manner without serialization.

While DCL allows the application to append additional modules called sub-rules to an already existing system, the present invention also separates the sub-rules appended on one space from those appended on another space. This will allow the application to maintain independent views of the various libraries that are loaded. This invention also provides constructs that allow the same state variable to exist on multiple contexts at the request of the library developer, and constructs for forcing serialization at these points. Contexts typically assume state variable independence except where explicitly requested by the library developer. This drastically improves the ease of developing parallel algorithms as only the necessary points of commonality need be scrutinized.

In operation, the present invention achieves an advantage by naturally segregating all activities associated with a thread to a context. Different threads operate on different contexts and therefore do not interact with one another, except when explicitly requested. This removes the serialization limitations that are typical in parallel processing, so that this invention simplifies both the thought process as well as the actual implementation.

The present invention further employs the use of thread contexts to provide non-blocking, efficient storage management for use in parallel environments. The storage manager keeps separate pools of available memory per context, and allocates memory only from those pools to the context in question. Many threads (one per context, as previously described) may simultaneously access the storage manager to obtain or free memory, without execution being blocked most of the time. While prior art practice blocks execution every time more than one thread requires a memory area to be allocated or freed at the same time, the present invention only blocks execution when more than one context has simultaneously exhausted its memory pool, and a call must be made to the system service that allocates memory. The invention preferably obtains a few, large areas of memory from the system, and partitions the memory area as needed by the threads. Since blocking of a thread occurs only if an attempt is made to obtain the few, large areas for that thread while another thread is also obtaining its large areas from the system, in general the performance of the invention far exceeds that of conventional methods. Even if blocked by one thread's call for the system to allocate another large chunk, the present system can still service requests for memory from other threads as long as their associated memory pools still have memory areas in them. Under normal circumstances, the probability is that the parallel application will suffer only a partial blockage of execution, and even then, it will occur seldom.

There are two dimensions to the question of freeing a memory area. If a context frees only memory areas that it allocated, the freeing operation proceeds without blocking the thread needing the area, or any other thread. To minimize the serialization that occurs when one context frees memory areas that were allocated by another context, a list of "deferred frees" is created. When a context frees a memory area which it did not allocate, the invention places this area on a "deferred list". Each context has a set of deterred lists, and each set of deferred lists has a deferred list for every other context. The memory area is then placed on the deferred list which identifies the context freeing the area and the other context to which it is tentatively freed, and execution continues without blocking. These lists grow until they exceed a metric, which can be set by the application program. When the metric is exceeded, the deferred list for each other context is transferred in a non-blocking manner to the other, receiving, context which now owns it. Each memory area has a mark in it, and the mark indicates which context allocated the area. Once the transfer is complete, the transferring context sets a flag in a known spot of the receiving context, without any blocking.

When a context must allocate memory areas, but before it requests space from the system, it checks to see if it has received any deferred frees from other contexts. If so, it reclaims those memory areas and attempt to satisfy requests from them instead of calling the system service. This eliminates even more blocking.

The reclamation of deferred blocks by receiving contexts is done in a non-blocking manner, and is allowed to be asynchronous in order to avoid blocking. The layout of the control data structures and the order of operations provides that reclamation will be successful in an asynchronous environment, at only the possible cost of missing some reclamations that were added during the processing. These missed reclamations are not lost, but will be recovered on the next reclamation cycle.

In a first situation, if a particular context frees a memory block it does not need, and if that memory block had been pre-identified as being allocated to that same context, it is simply identified as remaining available to that particular context. In a second situation, if a particular context frees a memory block it does not need, and if that memory block had been pre-identified as being allocated from another, different context, it is collected, in the same memory pools of the particular context on a reclamation list corresponding to the other, different context.

Preferably, the available memory blocks from one context and marked to another context are not actually freed and reclaimed by the other context until the other context seeks additional memory blocks. If the other context does not reclaim the memory blocks after a predetermined time period, the one context may reclaim them for use, while still retaining the identification of the other context on those blocks. All of this may take place before either context seeks memory from the main system memory.

Tests of this aspect of the present invention have shown that the parallel processing memory access is up to 20.7 times faster than the conventional prior art method.

Unlike the prior art which treats contexts and data differently, the present invention implements a new paradigm for the use of contexts in a parallel environment. The invention essentially creates a context and captures it, binding it to a data object which, from the programmer's perspective, is abstract. This allows a thread (or flow of control) to be treated as a data object by the software. This has a number of advantages. One advantage is that threads are created once and reused as needed. This avoids thread creation and destruction costs found in prevailing approaches. Another advantage is that threads are data objects, thus eliminating the prevailing dichotomy between control and data, and giving a programmer a greater mental field on which to envision solutions to problems. Another advantage is that because threads are data objects, previously impossible operations are available to a software developer. These operations include, but are not limited to, attaching threads to other data objects (for later use in execution), passing threads (control flows) as parameters, and the like.

This aspect of the present invention implements an abstract data object which has a thread waiting on it. The data object can be passed around and incorporated into the data structures of a program, as can any traditional data object. When desired, the software assigns particular work to the data object, which the waiting thread then wakes up and does. After performing the work, the thread again waits for more work. The work may be assigned from any section of the application, at any desired time. The thread is not destroyed until the application program decides to do so.

This approach greatly simplifies the creation of software that needs to leverage parallel operation by use of threads. By abstracting the thread, burdensome details are removed from the purview of the programmer. By encapsulating a waiting thread as a data object, the programmer has more degrees of freedom and greater range of solutions, because the dichotomy between control flow and the data is bridged.

Figure 6:
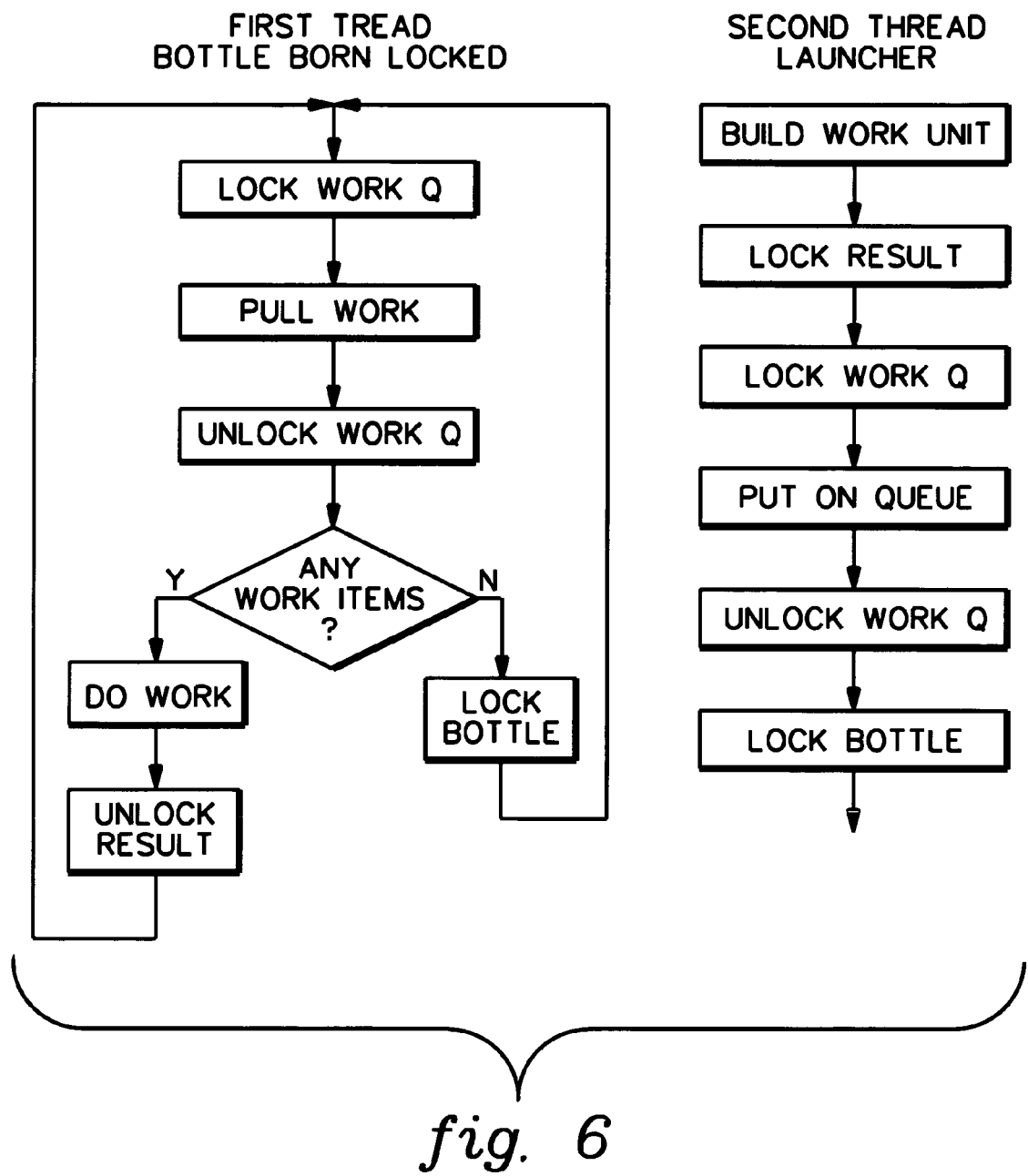
FIG. 6 is a schematic flow diagram of threads implemented as abstract data objects to which work is assigned, in accordance with an aspect of the present invention

FIG. 6 is a schematic flow diagram of threads implemented as abstract data objects to which work is assigned. A first thread is designated as a data object ("bottle") which is normally undispatched and unavailable to perform work designated for it by the program structure. Such work may be any work unit which may normally be performed by threads in parallel processing, such as functions to be used, collecting parameters, instructions as to where to place results and the like. The "bottle" is associated with a single context and can be activated to perform its work only by other contexts. In the present invention, preferably each bottle is unable to be activated by its own context. The bottle has only two states, a first state processing work for the program structure and a second state undispatched awaiting work to process, in a suspended state, not consuming execution time. The bottle has an associated queue (Q) into which requested work may be deposited by one or more other contexts. In operation, the bottle checks the queue for work requests and, if there is work awaiting in the queue, the bottle locks the queue, removes a work unit, unlocks the queue and performs the requested work. When the requested work is finished on the work unit, it marks the result as complete and checks the work queue again. The bottle processes the waiting work sequentially and essentially operates in an endless loop as long as work is awaiting execution in the queue. If the queue is empty, the bottle enters a deadlocked, undispatched condition waiting for some other context to place work in the queue and in turn cause the bottle to be dispatched and again check the work queue A second thread, which represents an independent flow of control managed by the program structure separate from the first or "bottle" thread, is identified in FIG. 6 as the "launcher". The launcher is used to prepare the work for the "bottle" to process. The launcher places the work in the queue for processing by the first "bottle", by locking the work queue, placing the work unit on the work queue, and then unlocking the queue. If the "bottle" is suspended, the launcher causes it to be dispatched. A launcher may continue to add additional work to the bottle queue. When placing work in the bottle queue, it marks the work as not complete. Any other context (outside the bottle context) may check to see if a particular result is complete, assuming each other context has access to the result structure.

Thus, instead of being destroyed after it completes a single task, the first thread is reused as desired by the program structure. The program structure destroys the first thread only after it completes a desired amount of work.

As noted initially herein, in a parallel environment (such as described above) where units of work are appended to the queue of another context, and that processing context is suspended on a mutex, the work on the queue will wait until the mutex is released. This time that the context is suspended is time that the context could be performing other useful work.

DCL currently has the ability to launch a unit of work on another context. A launch is a technique of giving a context other than the one doing the launching a function to execute. The processing context receiving the work (i.e., the target context) has a queue of pending units of work, and processes the units of work on this queue in order until the queue is empty. When the queue is empty, the target context suspends itself. When another context places a unit of work on an empty queue, the context awakens the suspended context or thread. In accordance with an aspect of the present invention, an out of order execution facility is provided, allowing a programmer to control the computing environment's activity in situations where contexts would otherwise be suspended.

Thus, provided herein is an "out of order execution" designation for work to be processed (generically referred to herein as "units of work") that allows a program developer the choice of putting units of work on a regular unit of work queue with a special designation that allows the option of the out of order execution of the units of work when a thread or context is either suspended or about to be suspended for a mutex or the traditional in-order processing currently available in DCL. In accordance with an aspect of the present invention, a facility is provided to reliably control the processing contexts, and when the contexts are awoken, in order to make out of order execution of units of work possible. Allowing the computing environment to execute units of work out of order removes potentially many mutexes formerly used to protect each data item or resource, and replaces that structure with a single mutex per context per thread. In a multi-threaded context environment, each context may have N threads, but only one thread is executing at a given instance, i.e., in a WORKING state. Essentially, when a thread is denied access to a resource it requires, the thread will look for other units of work that are assigned to that context. The other units of work may be queued on the stack, or suspended units of work awaiting resources that have just been released. If the current thread finds available units of work, and there exists an available thread for this context, then the current thread will start the available thread working and put itself in a WAITING state. This process continues until there are no threads left. When the list of available threads for a context is exhausted, the current thread may attempt to process the out of order work itself. Thus, an advantage and goal of the present invention is an ability to maintain as many processing engines working as often as possible on units of work, without operating system intervention.

Figure 7:
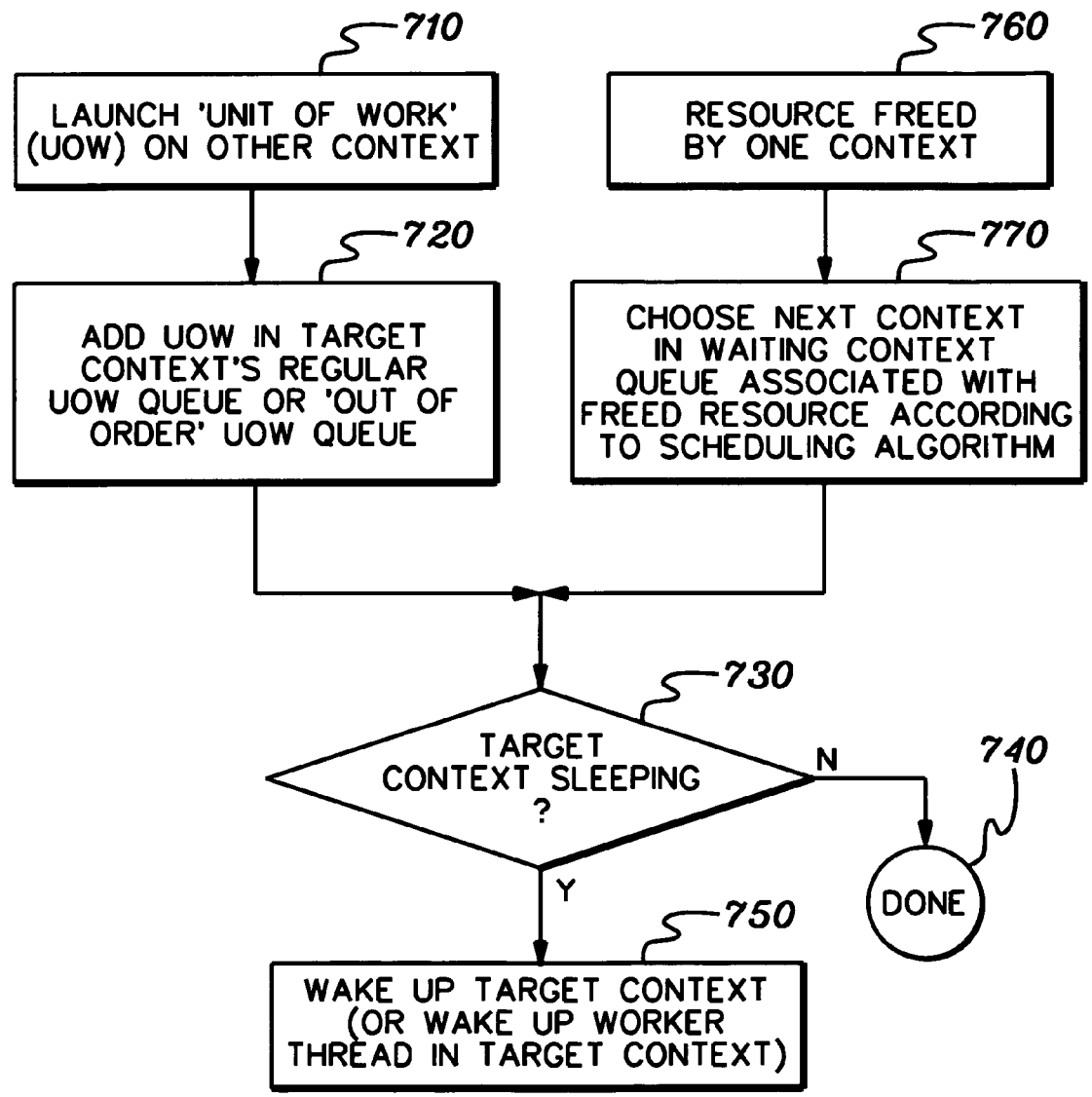
FIG. 7 is a flowchart of one embodiment of work launching and resource releasing processing for establishing that a target context is to be awakened, or a worker thread within the target context is to be awakened, in accordance with an aspect of the present invention.

FIG. 7 depicts processing for initiating a WORKING state on a target context from at least one other context of a computing environment. In the embodiments described herein, it is assumed that the computing environment comprises multiple contexts coupled in communication, with each context processing work independent of the other contexts. This processing approach includes the likelihood that the contexts are operating in parallel. As explained further below with reference to FIG. 10, this logic allows a context of the computing environment to launch a unit of work (UOW) on another, target context in the environment 710. This launching includes adding the unit of work (i.e., function to be processed) to the target context's regular unit of work queue and/or to an out of order unit of work queue (both of which are depicted in FIG. 11) if the unit of work is designated an out of order execution unit of work 720. An out of order execution unit of work is a unit of work which can be taken out of order from work in the regular unit of work queue for execution by the target context, or a thread of the target context. As used herein, the "regular unit of work queue" is, e.g., the same queue as the "work queue" of FIG. 6. Processing determines whether the target context is sleeping 730. If "no", then the processing is done 740; otherwise, processing wakes up the target context (or wakes up a worker thread in the target context (depending on the context implementation)) 750. In this regard, those skilled in the art will note from the following discussion that the concepts described herein are applicable to both a single-threaded context environment, and a multi-threaded context environment. In a multi-threaded context environment, any number of threads may be in a WAITING state, but only one thread can be in a WORKING state at a time.

As also shown in FIG. 7, another path to waking up a target context is through a resource being freed by another context of the computing environment 760. A next context in a "waiting context queue" associated with the freed resource is selected according to a scheduling algorithm 770. The scheduling algorithm can be programmer selected, and may simply comprise a first-in first-out ordering algorithm. Processing then again determines whether the next context in the waiting context queue is sleeping 730. If "no", processing is done 740; otherwise the sleeping target context (or worker thread in the target context) is awoken 750.

Figure 8:
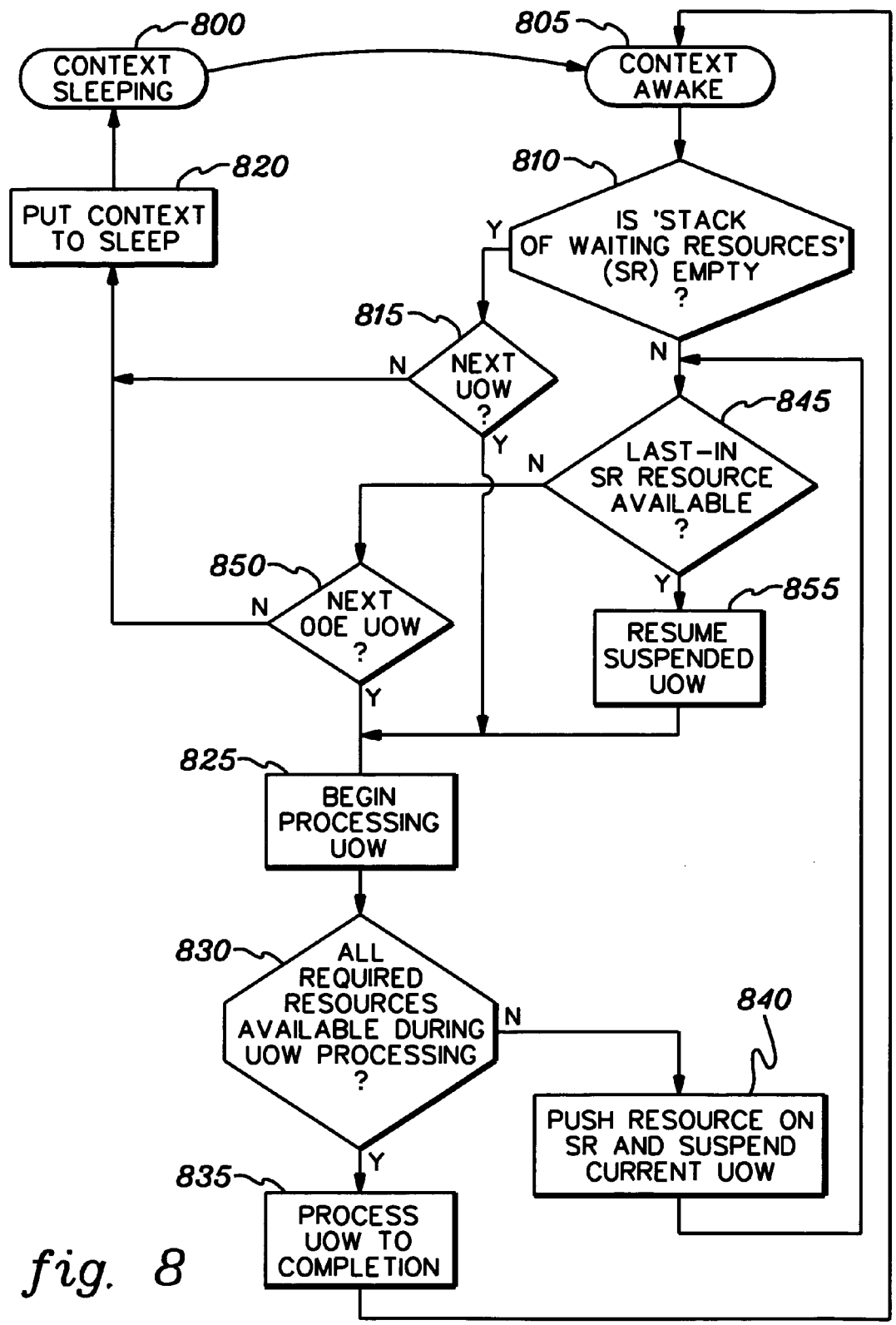
FIG. 8 is a flowchart of one embodiment of work processing in a single-threaded target context, in accordance with an aspect of the present invention.

FIG. 8 is a flowchart of one embodiment of work processing at a target context, in accordance with an aspect of the present invention. This processing embodiment assumes that the context comprises a single thread, and that resources in a stack of waiting resources associated with the thread are processed in the reverse order from which they are added to the stack of waiting resources. That is, the last-in identified resource in the stack of waiting resources is the first-out resource to be processed. In this implementation, a unit of work can be waiting on only one resource. That is, the unit of work can only be blocked once. Should this occur, the out of order execution facility provided herein allows the context to process another unit of work. The limitation is that the stack of waiting resources must collapse back in an orderly manner; that is, in the reverse order that identifications of waiting resources are added to the stack.

As shown in FIG. 8, upon a context transitioning from a SLEEPING state 800 to an AWAKE state 805, processing determines whether the associated stack of waiting resources is empty 810. If "yes", a next unit of work (UOW) is obtained, i.e., if available, from the regular unit of work queue for the context. If no further unit of work is currently available, then the context is put to sleep 820. Assuming that a unit of work is available, then the context begins processing the unit of work 825. During this processing, the context may require one or more resources of the computing environment 830. Assuming that the resources are available, then the context processes the unit of work to completion 835, before returning to again inquire whether the stack of waiting resources is empty 810. If a required resource for processing the unit of work is unavailable, then an identification of the resource is pushed onto the stack of waiting resources, and the current unit of work is suspended 840.

After suspending the current unit of work, or assuming that the stack of waiting resources is not empty, then processing inquires whether the last-in listed resource in the stack of waiting resources is now available 845. If "yes", then the last suspended unit of work is resumed 855, thereby continuing processing of the unit of work 825 as described above. Assuming that the last-in listed resource in the stack of waiting resources is still unavailable, then processing inquires whether there is an out of order execution unit of work available in the out of order unit of work queue for the context 850. If "no", then the context is again put to SLEEP 820. Otherwise, the out of order execution unit of work undergoes processing 825 as described above.

Figure 9:
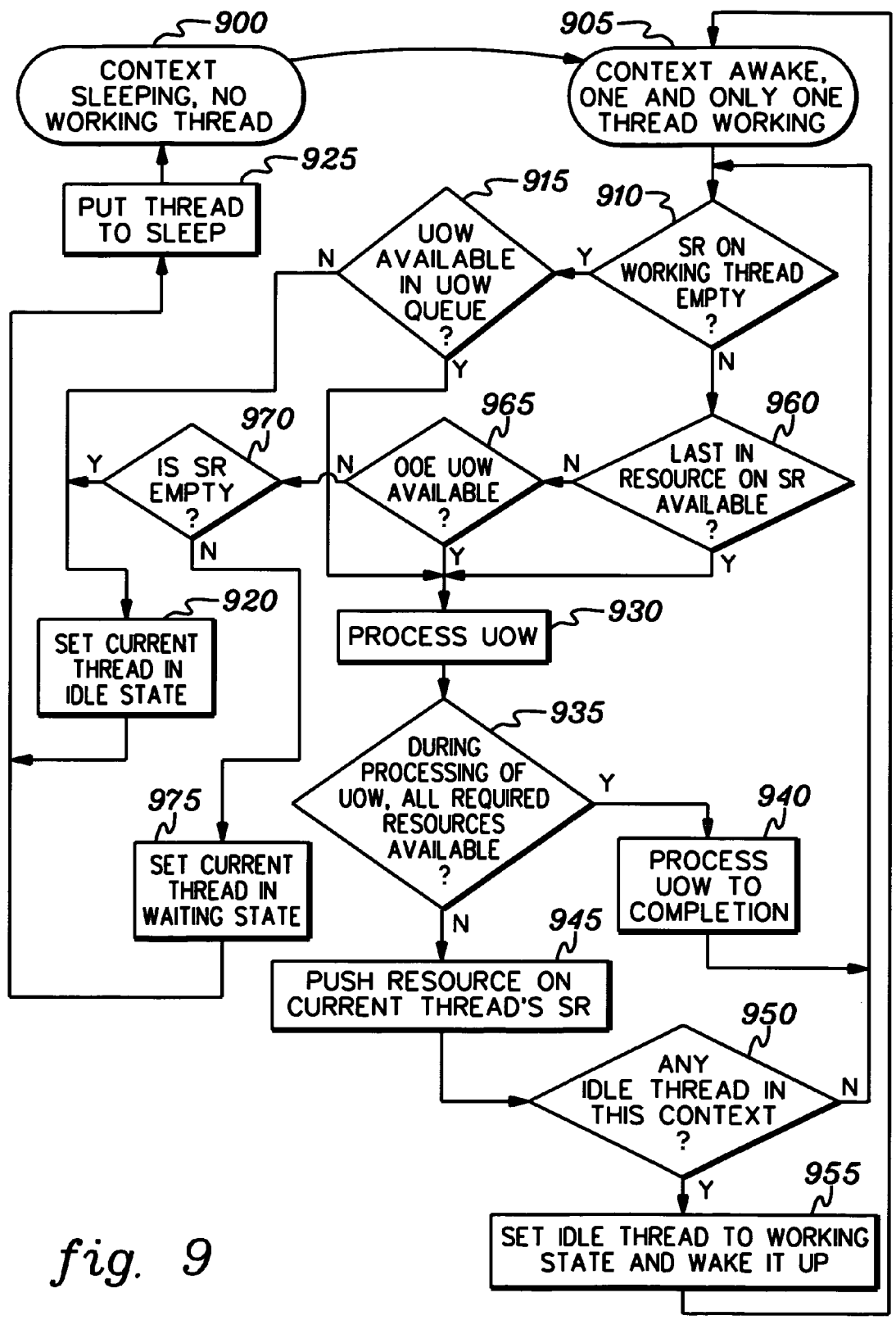
FIG. 9 is a flowchart of one embodiment of work processing in a multi-threaded target context, in accordance with an aspect of the present invention.

FIG. 9 depicts an alternate unit of work processing approach, in accordance with an aspect of the present invention. This approach assumes that each context has multiple threads, with only one thread of the multiple threads in a WORKING state at a time. Each worker thread of the multiple threads has one of three possible states; i.e., IDLE, WORKING or WAITING. In the IDLE state, the worker thread is sleeping and ready to be used, while in a WORKING state, the worker thread is currently busy processing work. In the WAITING state, the worker thread is waiting for a resource, and is currently sleeping. Since only one worker thread is in the WORKING state at a time, work on the same context cannot be processed in parallel. The advantage of the processing of FIG. 9 is that it avoids the restriction of the embodiment of FIG. 8, wherein the stack of waiting resources must be resolved in the reverse order to which resources are listed, that is, the last-in first-out approach. In this embodiment, each working thread of the multiple working threads of the context has an associated stack of waiting resources, and the context again includes a regular unit of work queue and an out of order unit of work queue. Processing begins when the context is transitioned from a SLEEPING state, with no worker thread in a WORKING state 900, to a context AWAKE state, with one and only one worker thread in a WORKING state 905. The worker thread in the WORKING state determines whether its associated stack of waiting resources is empty 910, and if so, obtains a unit of work from the regular unit of work queue 915. If the queue is empty, then the current worker thread is set to an IDLE state 920, and the thread is put to sleep 925. Assuming that a unit of work is available in the regular queue, then the thread processes the unit of work 930. During processing of the unit of work, the thread determines whether all required resources are available 935. If "yes", then the unit of work is processed to completion 940, and the logic returns to again determine whether the associated stack of waiting resources is empty 910. If a required resource is unavailable during processing of the unit of work, then an identification of the required resource is pushed onto the current thread's stack of waiting resources (SR) 945, and processing determines whether there is any IDLE thread in this context 950. If "no", then processing returns to inquire whether the stack of waiting resources for the worker thread in WORKING state is empty 910. If an IDLE thread exist within the context, then the IDLE thread is set to the WORKING state, and woken up 955. Thereafter, the current thread is set to a WAITING state and put to sleep, and processing then determines whether the stack of waiting resources associated with the newly awoken thread is empty 910.

If the stack of waiting resources for the worker thread in the WORKING state is not empty, then from inquiry 910 processing determines whether the last-in resource in the stack of waiting resources is available 960. If "yes", then processing of the suspended unit of work awaiting the last-in listed resource is resumed and the work proceeds as described above 930. Assuming that the last-in listed resource on the stack of waiting resources remains unavailable, then processing determines whether there is an out of order execution unit of work available 965. This can include, for example, referencing the out of order unit of work queue for the context. If an out of order execution unit of work is available, then that out of order execution unit of work is processed 930 as described above. Should the out of order unit of work queue be empty, then processing determines whether the stack of waiting resources associated with the worker thread in WORKING state is empty 970. If "no", then the current worker thread is set to a WAITING state 975, otherwise the current worker thread is set to an IDLE state 920.

Figure 10:
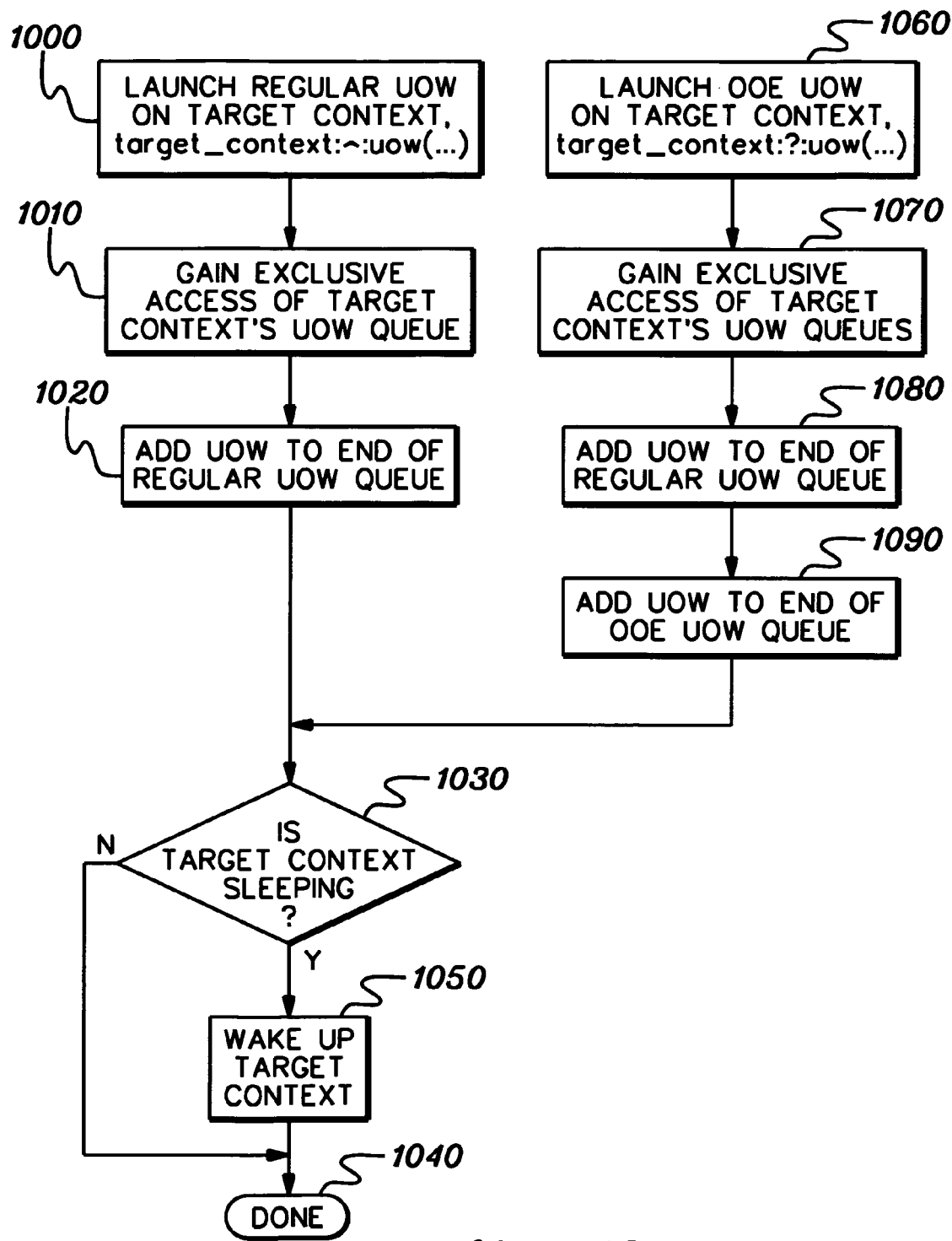
FIG. 10 is a flowchart of one embodiment of logic for launching a regular unit of work, as well as for launching an out of order execution unit of work on a target context, in accordance with an aspect of the present invention.
Figure 11:
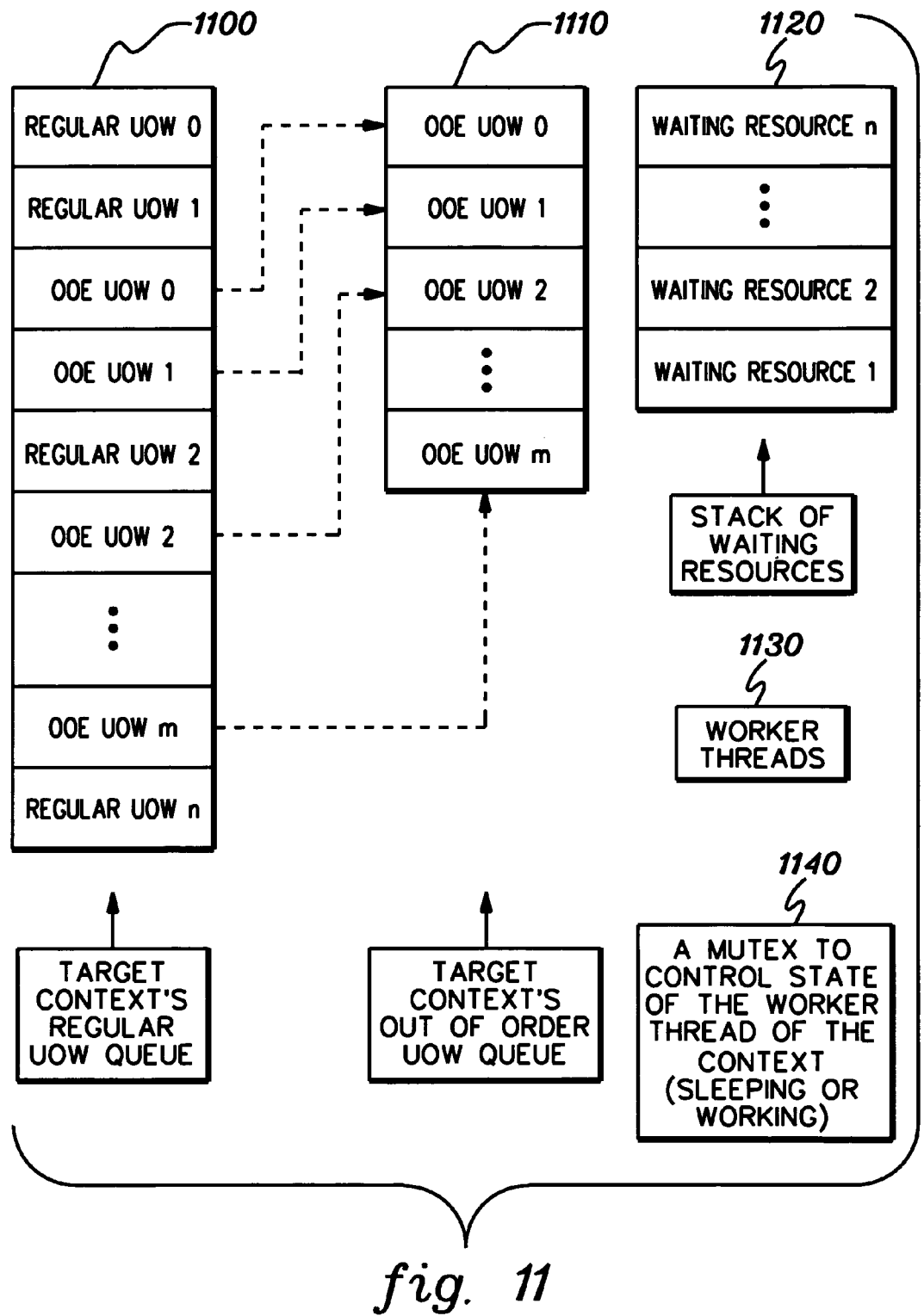
FIG. 11 depicts a sample data structure for a processing context, in accordance with an aspect of the present invention.

FIG. 10 depicts one embodiment of processing for launching a regular unit of work, and for launching an out of order execution unit of work from one processing context of a computing environment onto another processing context of the computing environment. By way of example, this logic flow is an extension of existing DCL operators. In a DCL launch operator, the target context is identified on the left, and the actual unit of work requested of the target context on the right. In the example of FIG. 10, the connection ":^:" references a regular unit of work, while ":?:" references an out of order execution unit of work.

As shown, a regular unit of work is launched on the target context 1000 by a first context gaining exclusive access of the target context's regular unit of work queue 1010. This unit of work is then added to the end of the regular unit of work queue 1020, of the target context and processing determines whether the target context is SLEEPING 1030. If "no", then processing is done 1040; otherwise, the target context is awoken 1050 before completing processing.

An out of order execution unit of work is launched 1060 with a different launch operator as noted above, and with a first context gaining exclusive access to the target context's work queues 1070. The out of order execution unit of work is added to the end of the regular unit of work queue 1080, as well as to the end of the out of order unit of work queue 1090 of the target context. Thereafter, the initiating context determines whether the target context is SLEEPING 1030, and if so, awakens the target context 1050, before completing processing 1040.

FIG. 11 depicts one embodiment of a data structure for a context, in accordance with an aspect of the present invention. This data structure includes a regular unit of work queue 1100, an out of order unit of work queue 1110, a stack of waiting resources 1120 per worker thread, multiple worker threads 1130, and a mutex per worker thread to control the state of the worker thread 1140. As shown, both regular units of work (UOW) items and out of order execution (OOE) units of work (UOW) are added to the regular unit of work queue 1100. This work queue 1100 operates in an analogous matter to an existing work queue, with the only difference being certain units of work are designated as out of order execution units of work (e.g., OOE UOW 0, OOE UOW 1, OOE UOW 2 ... OOE UOW m). Thus, both the regular units of work and the out of order execution units of work are processed in a first-in first-out manner from the regular unit of work queue 1100. However, as noted above, the designated out of order execution units of work are also listed in the out of order unit of work queue 1110, which is referenced when the stack of waiting resources of the worker thread in WORKING state is not empty, and the last-in listed resource remains unavailable. Each worker thread has a stack of waiting resources which are processed in a last-in first-out order as described above in connection with FIG. 8, which are also used in the multi-thread embodiment of FIG. 9 after all IDLE state threads have been processed. In such a case, the units of work waiting on a required resource are stacked up in a similar manner as the single-threaded context implementation. Further, as noted, a simplification is provided by the processing of the present invention in that a mutex is associated with each worker thread, rather than being associated with each resource.

Figure 12A:
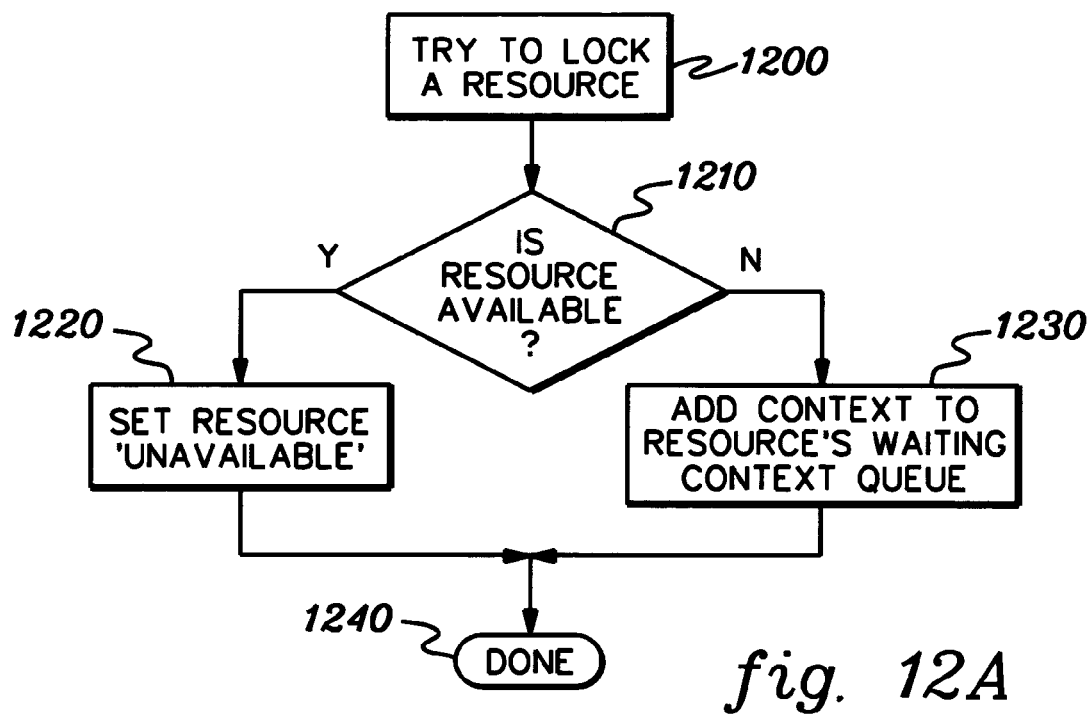
FIG. 12A is a flowchart of one embodiment of logic for attempting to acquire a lock on a required resource during processing of a unit of work by the target context, in accordance with an aspect of the present invention.
Figure 12B:
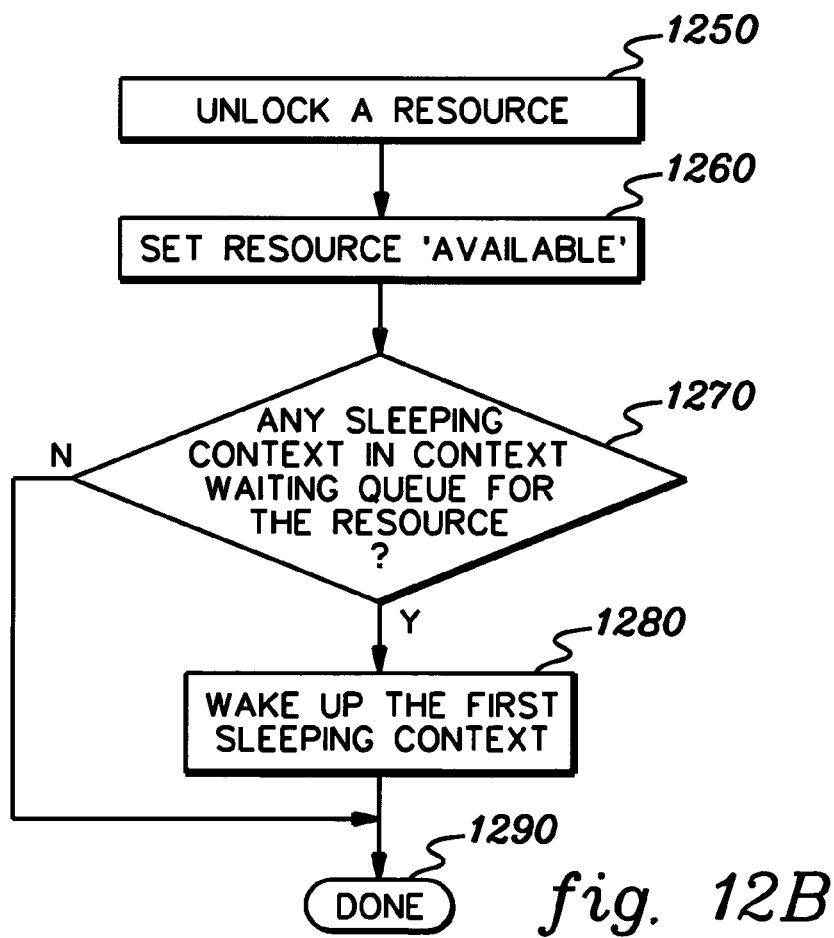
FIG. 12B is a flowchart of one embodiment of logic for unlocking a resource and awaking a sleeping context with reference to a context waiting queue for the resource, in accordance with an aspect of the present invention.

FIG. 12A depicts one embodiment of processing for attempting to lock a resource, while FIG. 12B depicts processing for unlocking a resource. An attempt to lock a resource is made while processing a unit of work 1200. Processing determines whether the resource is available 1210. If, "yes", then the resource is set to "unavailable" 1220, while the resource is employed in processing the unit of work to completion 1240. If the resource is not available, then the context is added to the resource's waiting context queue 1230, referenced above in FIG. 7.

Unlocking of a resource 1250 (also referenced in FIG. 7) includes setting the resource "available" 1260. Unlocking of a resource can be performed from any context within the computing environment. After setting the resource available, the context determines whether there is any SLEEPING context in the context waiting queue for the resource 1270. If "no", then processing is complete 1290. Otherwise, the first SLEEPING context in the context waiting queue for the resource is awoken 1280.

Figure 13:
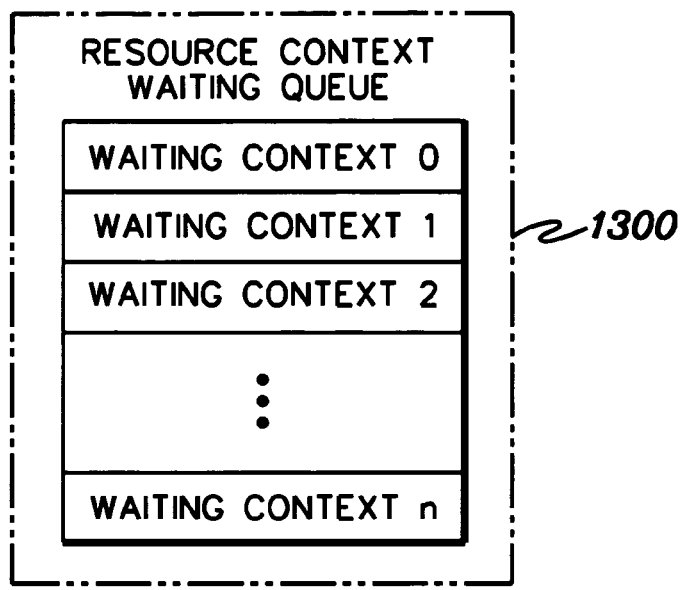
FIG. 13 is a schematic diagram of one embodiment of a resource's context waiting queue, in accordance with an aspect of the present invention.

FIG. 13 depicts one embodiment of a resource "context waiting queue" 1300. In this example, the context waiting queue contains multiple contexts waiting for the resource (i.e., waiting context 0, waiting context 1, waiting context 2 ... waiting context n). Again, this context waiting queue is a data structure associated with a resource and is employed, in accordance with an aspect of the present invention, to control awakening of sleeping contexts waiting on the associated resource.

To summarize, the adaptive scheduling and management of work processing described herein allows one or more units of work to be executed out of order, with no requirement that the data being processed be similar in nature. Using the work processing concepts disclosed herein, the different units of work being processed can be completely unrelated in content, size and processing requirements. The out of order execution concepts presented are intended to maintain a thread in WORKING state by allowing the thread to process other pieces of work when one unit of work becomes stalled.

The parallel software system described herein may be created and stored in a machine, preferably a conventional computer on a computer usable medium, using conventional computer readable code, on an otherwise conventional program storage device, such as a semiconductor ship, a read-only memory, optically read media such as a CD-ROM or DVD-ROM, or magnetic media such as a diskette or computer hard drive.

Figure 14A:
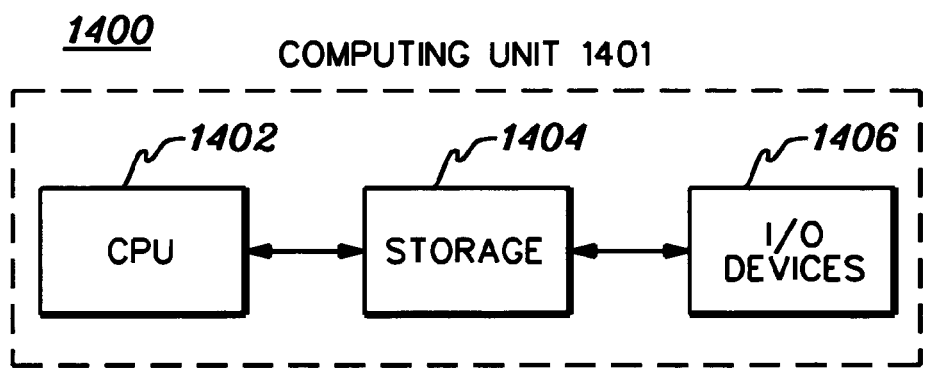
FIG. 14A is a schematic diagram of one embodiment of a computing environment to employ work scheduling and management, in accordance with aspects of the present invention.

One example of a computer environment incorporating and using the scheduling and management facility of the present invention is depicted in FIG. 14A and described below.

Referring to FIG. 14A, a computer environment 1400 includes, for instance, a computing unit 1401 having at least one central processing unit 1402, a main storage 1404 and one or more input/output devices 1406, each of which is described below.

As is known, central processing unit 1402 is the controlling center of computing unit 1401 and provides the sequencing and processing facilities for instruction execution, interruption action, timing functions, initial program loading and other machine related functions. The central processing unit executes at least one operating system, which as known, is used to control the operation of the computing unit by controlling the execution of other programs, controlling communication with peripheral devices and controlling use of the computer resources.

Central processing unit 1402 is coupled to main storage 1404, which is directly addressable and provides for high speed processing of data by the central processing unit. Main storage may be either physically integrated with the CPU or constructed in stand alone units.

Main storage 1404 is also coupled to one or more input/output devices 1406. These devices includes, for instance, keyboards, communications controllers, teleprocessing devices, printers, magnetic storage media (e.g., tape, disks), direct access storage devices, and sensor based equipment. Data is transferred from main storage 1404 to input/output devices 1406, and from the input/output devices back to main storage.

In one example, computer environment 1400 is a single system environment, which includes an RS/6000 computer system running an AIX operating system. (RS/6000 and AIX are offered by International Business Machines Corporation). The invention is not limited to such an environment, however. The capabilities of the present invention can be incorporated and used within many types of computer environments and many types of computer systems. For instance, computer environment 1400 can include a UNIX workstation running a UNIX-based operation system. Other variations are also possible and are considered a part of the claimed invention.

Figure 14B:
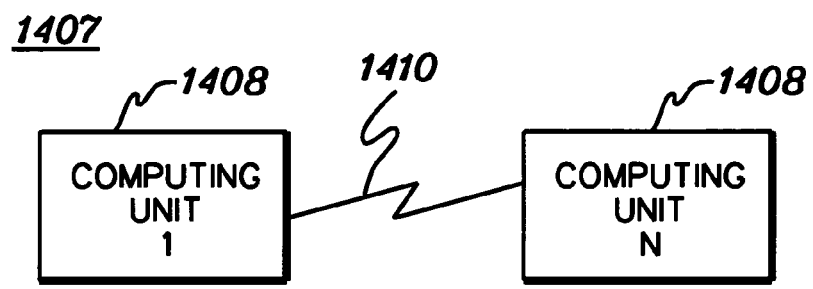
FIG. 14B is an alternate embodiment of a computing environment to employ work scheduling and management, in accordance with aspects of the present invention.

Another embodiment of a computer environment incorporating and using the scheduling and management facility of the present invention is depicted in FIG. 14B and described in detail below.

In one example, a computer environment 1407 includes a plurality of computing units 1408 coupled to one another via a connection 1410. In one example, each unit is a UNIX workstation running a UNIX-based operating system, and the units are coupled to one another via a TCP/IP connection. Each unit includes, for example, a central processing unit, memory and one or more input/output devices, which are well known in the art.

The above-described computer environment in which each unit is a UNIX workstation running a UNIX-based operating system is only one example, however. The processing capability of the present invention can be incorporated and used with any type of computing units, computers, processors, nodes, systems, workstations and/or environments, without departing from the spirit of the present invention.

For instance, in another embodiment, one or more of the units is a PS/2 offered by International Business Machines Corporation. In a further embodiment, one or more of the units is based upon the Enterprise Systems Architecture offered by International Business Machines Corporation. Further, the operating system need not be UNIX-based. For example, the operating system can include the Multiple Virtual Storage (MVS) operating system offered by International Business Machines Corporation. Additionally, connection 1410 need not be TCP/IP. It can be any type of wire connection, token ring or network connection, to name just a few more examples.

In yet a further embodiment, the environment includes a large parallel system with a plurality of units (e.g., 512 nodes) coupled to one another via a network connection, such as a switch. Additionally, in other environments, the units can be of differing types connected to one another via one or more connections. The invention is not limited to a particular number of units coupled together nor the type of units that are coupled.

Again, neither a computing unit nor the invention is limited to the above examples. A computing unit can include other types of nodes, computers, processors, systems, workstations, and/or environments without departing from the spirit of the present invention. All of these types are considered within the scope of the present invention.

Figure 15:
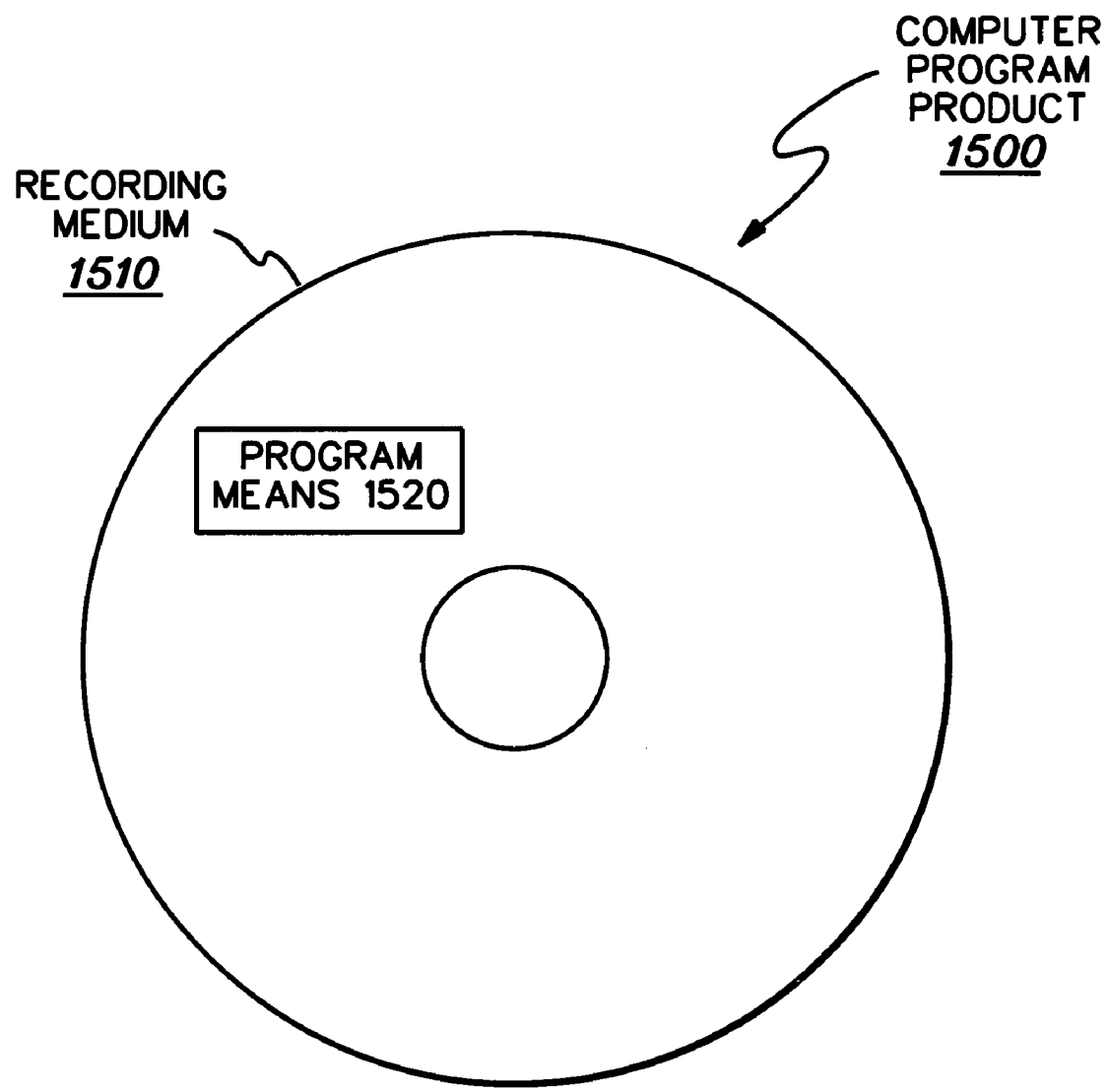
FIG. 15 is a diagram of one embodiment of a computer program product embodying work scheduling and management, in accordance with aspects of the present invention.

Referring now to FIG. 15, an article of manufacture or a computer program product 1500 of the invention is illustrated. The computer program product 1500 includes a recording medium 1510, such as, a floppy disk, a high capacity read-only memory in the form of an optically read compact disk or CD-ROM, a tape, a transmission type media such as a digital or analog communications link, or a similar computer program product. Recording medium 1510 stores program means 1520 on the medium 1510 for carrying out the order of execution processing of the preferred embodiment in, for example, the computing environments of FIGS. 14A and 14B.

A sequence of program instructions or a logical assembly of one or more interrelated modules defined by the recorded program means 1520 direct the computing environment in implementing out of order execution of units of work in accordance with an aspect of the present invention.

In summary, one or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method for processing work in a processing context of a computing environment, the method comprising:

(i) determining, for a processing context comprising an executing processing thread with a data space comprising a regular unit of work queue identifying units of work to be processed, an out of execution order unit of work queue identifying units of work in the regular unit of work queue which may be processed out of execution order, and a stack identifying resources that the executing processing thread is waiting for to process one or more suspended units of work, whether a last-in identified resource in the stack is now available, and if so, resuming processing of a suspended unit of work requiring the last-in identified resource in the stack;

(ii) determining, otherwise from the out of execution order unit of work queue, whether an out of execution order unit of work is available for processing, and if so, processing the out of execution order unit of work while the suspended unit of work awaits the last-in identified resource in the stack; and (iii) repeating the determining (ii) until the last-in identified resource of the stack is available, or until no further out of execution order unit of work is available in the processing context, and if so, placing the processing context in a SLEEP state.

2. The method of claim 1, further comprising pushing an identification of a required resource onto the stack if, during processing of a current unit of work, a required resource is unavailable, and thereafter suspending the current unit of work.

3. The method of claim 1, wherein the processing context comprises a target context and wherein the method further comprises placing a designated out of execution order unit of work from another processing context of the computing environment in the regular unit of work queue maintained by the target context, and thereafter, awaking the target context, if the target context is in a SLEEP state, for facilitating processing of the designated out of execution order unit of work.

4. The method of claim 3, wherein units of work are processed sequentially from the regular unit of work queue in a first-in first-out manner, and wherein the designated out of execution order unit of work is also placed in the out of execution order unit of work queue for processing by the target context other than in the sequential, first-in first-out manner of the regular unit of work queue.

5. The method of claim 1, wherein the processing context comprises multiple worker processing threads, only one worker processing thread of the multiple worker processing threads being in a WORKING state at a time, and each worker processing thread comprising a stack identifying resources that the worker processing thread is waiting for to process suspended units of work being processed by the worker processing thread, and wherein the method comprises for a worker thread in WORKING state, determining whether the last-in identified resource in its stack is available, and if so, processing a unit of work awaiting the last-in identified resource, otherwise, determining whether an out of execution order unit of work is available in the out of execution order unit of work queue, and if so, processing the out of execution order unit of work.

6. The method of claim 5, further comprising pushing an identification of a required resource onto the stack of the worker processing thread in WORKING state when the required resource is unavailable, and determining whether there is another worker processing thread in IDLE state in the processing context, and if so, waking the another worker processing thread from IDLE state and setting that worker processing thread to WORKING state to attempt processing of a unit of work.

7. The method of claim 6, further comprising determining whether the awoken worker processing thread's stack is empty, and if so, obtaining a unit of work from the regular unit of work queue of the processing context for processing, otherwise repeating the determining (i) and the determining (ii) for the awoken worker processing thread of the processing context.

8. The method of claim 7, wherein when the out of execution order unit of work queue is empty, the method further comprises determining whether the stack identifying resources that the awoken worker processing thread is waiting for to process suspended units of work is empty, and if so, setting the awoken worker processing thread to an IDLE state, otherwise setting the awoken worker processing thread to a WAITING state.

9. The method of claim 1, wherein the processing context comprises a target context and wherein the method further comprises launching one or more units of work from another processing context of the computing environment on the target context, the launching comprising adding the one or more units of work to at least one of the regular unit of work queue or the out of execution order unit of work queue of the target context, and wherein the one or more units of work comprise at least one designated out of execution order unit of work.

10. The method of claim 9, wherein for each designated out of execution order unit of work of the one or more units of work from the another processing context, the launching comprises placing the out of execution order unit of work in the regular unit of work queue and in the out of execution order unit of work queue of the target context, wherein the out of execution order unit of work can be processed in order from the regular unit of work queue or out of order from the out of execution order unit of work queue.

11. The method of claim 1, wherein the processing context comprises a plurality of worker processing threads, each worker processing thread having a mutex associated therewith to control the state of the worker processing thread, wherein only one worker processing thread of the plurality of worker processing threads is in a WORKING state at a time.

12. A computer-implemented method for processing work within a computing environment having multiple processing contexts, wherein each processing context is a single-threaded processing context comprising an executing processing thread with a respective data space, the data space comprising a stack identifying resources that the executing processing thread is waiting for to process suspended units of work, the stack identifying resources in a last-in first-out manner as required for suspended units of work to be processed by that executing processing thread, the method comprising:

launching from a first processing context of the computing environment a designated out of execution order unit of work on a second processing context of the computing environment, the launching comprising adding the designated out of execution order unit of work to at least one of a regular unit of work queue of the second processing context identifying units of work for sequential first-in first-out processing and an out of execution order unit of work queue of the second processing context identifying units of work in the regular unit of work queue which may be processed out of execution order, wherein the designated out of execution order unit of work is a designated unit of work which can be processed out of sequential order from other units of work queued in the regular unit of work queue of the second processing context; and determining whether the second processing context is in SLEEPING state, and if so, transitioning the second processing context to AWAKE state to facilitate processing of the designated out of execution order unit of work.

13. The method of claim 12, wherein the launching comprises gaining exclusive access to the second processing context's regular unit of execution work queue and out of execution order unit of work queue, and adding the designated out of execution order unit of work to both the regular unit of work queue and the out of execution order unit of work queue of the second processing context, wherein the designated out of execution order unit of work can be processed in sequential order with other units of work from the regular unit of work queue of the second processing context, or out of order of other units of work in the regular units of work queue from the out of execution order unit of work queue of the second processing context.

14. A computer system comprising:
multiple processing contexts coupled in communication for parallel processing, each processing context comprising an executing processing thread with a respective data space, the respective data space of at least one processing context comprising:
    a regular unit of work queue for storing units of work for sequential first-in first-out processing thereof by the respective processing context; and
    an out of execution order unit of work queue, the out of execution order unit of work queue storing designated out of order execution units of work from other processing contexts of the multiple processing contexts, wherein the respective processing context can process designated out of execution order units of work out of order from other units of work in the regular unit of work queue of the respective processing context,
the at least one processing context further comprising logic for determining for an executing processing thread that a last-in identified resource in the associated stack remains unavailable, and for obtaining and processing an out of execution order unit of work from the out of execution order unit of work queue while the suspended unit of work awaits availability of the last-in identified resource in the stack of waiting resources.

15. The computer system of claim 14, wherein the at least one processing context is a single-threaded processing context and the respective data space of each executing processing thread of the at least one processing context further comprises a stack identifying resources that the executing processing thread is waiting for to process suspended units of work, the stack identifying resources in a last-in first-out manner as required for suspended units of work to be processed by the that executing processing thread.

16. The computer system of claim 14, wherein the at least one processing context comprises a multi-threaded processing context, and wherein each processing thread of the multi-threaded processing context comprises a data space with a stack identifying in a last-in first-out manner resources that suspended units of work processed by that processing thread require.

17. The computer system of claim 16, wherein each processing thread of the multi-threaded processing context has associated therewith a mutex for controlling the state of the processing thread.

18. At least one program storage device readable by a computer, tangibly embodying at least one program of instructions executable by the computer to perform when executing a method of processing work in a processing context of a computing environment, the method comprising:
    (i) determining, for a processing context comprising an executing processing thread with a data space comprising a regular unit of work queue identifying units of work to be processed, an out of execution order unit of work queue identifying units of work in the regular unit of work queue which may be processed out of execution order, and a stack identifying resources that the executing processing thread is waiting for to process one or more suspended units of work, whether a last-in identified resource in the stack is now available, and if so, resuming processing of a suspended unit of work requiring the last-in identified resource in the stack;
    (ii) determining, otherwise from the out of execution order unit of work queue, whether an out of execution order unit of work is available for processing, and if so, processing the out of execution order unit of work while the suspended unit of work awaits the last-in identified resource in the stack; and
    (iii) repeating the determining (ii) until the last-in identified resource of the stack is available, or until no further out of execution order unit of work is available in the processing context, and if so, placing the processing context in a SLEEP state.

19. The at least one program storage device of claim 18, wherein the processing context comprises a target context and wherein the method further comprises placing a designated out of execution order unit of work from another processing context of the computing environment in the regular unit of work queue of the target context, and wherein units of work are typically processed sequentially in a first-in first-out manner from the regular unit of work queue, and wherein the designated out of execution order unit of work is processed in the target context out of execution order from at least one other unit of work in the regular unit of work queue of the target context.

20. The at least one program storage device of claim 19, wherein the target context further comprises an out of execution order unit of work queue, and wherein the placing further comprises placing the designated out of execution order unit of work in both the regular unit of work queue and the out of execution order unit of work queue, wherein the designated out of execution order unit of work can be processed in sequential order with other units of work from the regular unit of work queue or out of order of the other units of work from the out of execution order unit of work queue.

21. The at least one program storage device of claim 18, wherein the processing context comprises multiple worker processing threads, only one worker processing thread of the multiple worker processing threads being in a WORKING state at a time, and each worker processing thread comprising a stack identifying resources that the worker processing thread is waiting for to process suspended units of work being processed by the worker processing thread, and wherein the method comprises for a worker thread in WORKING state, determining whether the last-in identified resource in its stack is available, and if so, processing a unit of work awaiting the last-in identified resource, otherwise, determining whether an out of execution order unit of work is available in the out of execution order unit of work queue, and if so, processing the out of execution order unit of work.

* * * * *